(12) United States Patent
Hong

(10) Patent No.: US 10,491,015 B2
(45) Date of Patent: Nov. 26, 2019

(54) APPARATUS AND METHOD FOR MANAGING POWER SUPPLIED TO AN ELECTRONIC DEVICE

(71) Applicant: Samsung Electronics Co., Ltd., Gyeonggi-do (KR)

(72) Inventor: Eun-Seok Hong, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 680 days.

(21) Appl. No.: 15/093,239

(22) Filed: Apr. 7, 2016

(65) Prior Publication Data
US 2016/0301228 A1 Oct. 13, 2016

(30) Foreign Application Priority Data
Apr. 7, 2015 (KR) .......................... 10-2015-0049198

(51) Int. Cl.
*H02J 7/00* (2006.01)
(52) U.S. Cl.
CPC .......... *H02J 7/0031* (2013.01); *H02J 7/0052* (2013.01); *H02J 7/0055* (2013.01); *H02J 2007/0062* (2013.01)
(58) Field of Classification Search
USPC ........................................................ 320/138
See application file for complete search history.

(56) References Cited

U.S. PATENT DOCUMENTS

| 8,482,260 B2 * | 7/2013 | Hsieh .................... H02J 7/0068 307/66 |
| 2003/0054703 A1 | 3/2003 | Fischer et al. |
| 2008/0174277 A1 * | 7/2008 | Ueno .................... H02J 7/0055 320/138 |

OTHER PUBLICATIONS

Universal Serial Bus Type-C Cable and Connector Specification, Release 1.0, USB Type-C Cable and Connector Specification, Aug. 11, 2014 Copyright 2014 USB 3.0 Promotor Group, pp. 171.
USB Type-C Functional, Brad Saunders Intel, Sep. 16, 2014, Copyright 2014 USB Implementers Forum, pp. 99.

* cited by examiner

*Primary Examiner* — Eric D Lee
(74) *Attorney, Agent, or Firm* — The Farrell Law Firm, P.C.

(57) ABSTRACT

An electronic device and an operation method thereof are provided. The electronic device includes a connecting unit configured to connect to an external power supply device that provides power to the electronic device; a first power managing unit configured to drive the electronic device using power provided from a first external power supply device connected to the connecting unit; a second power managing unit configured to charge a battery contained in the electronic device using power provided from a second external power supply device connected to the connecting unit; and a switching module configured to connect the connecting unit to one of the first power managing unit and the second power managing unit. Also, connection pins are not configured redundantly and respectively for external power supply devices, but a connecting unit is unified through a single common wiring and is commonly used, and thus, a wiring and components for supplying power may be reduced.

17 Claims, 10 Drawing Sheets

APPARATUS AND METHOD FOR MANAGING POWER SUPPLIED TO AN ELECTRONIC DEVICE

PRIORITY

This application claims priority under 35 U.S.C. § 119(a) to Korean Patent Application Serial No. 10-2015-0049198, which was filed in the Korean Intellectual Property Office on Apr. 7, 2015, the entire content of which is incorporated herein by reference.

BACKGROUND

1. Field of the Disclosure

The present disclosure relates generally to providing power to an electronic device, and more specifically, to an apparatus and method of managing power supplied to an electronic device.

2. Description of the Related Art

Herein, an electronic device refers to a device that performs a predetermined function corresponding to an installed program, such as a home appliance, an electronic scheduler, a portable multimedia player, a mobile communication terminal, a tablet personal computer (PC), a video/audio device, a desktop/laptop computer, a navigation unit for a vehicle, etc.

An electronic device may be driven by receiving power from an external power supply device.

When an electronic device contains a battery, the electronic device may charge the battery by receiving power from an external power supply device, and the battery may provide power required for driving the electronic device.

In an electronic device, a power circuit for performing a production test with respect to the electronic device contained inside the electronic device is electrically wired in a main circuit board (Printed Circuit Board (PCB)) and a charging circuit for charging a battery contained inside the electronic device is electrically wired in a sub-flexible circuit board (Flexible Printed Circuit Board (FPCB)), respectively.

The power circuit is used to test the electronic device during a production process and debugging, but the power circuit is not used when a consumer uses the electronic device.

The power circuit uses a design scheme identical to a design scheme of the charging circuit, and a PCB design is standardized. The power circuit may occupy the same space as the charging circuit in the electronic device during the process, thereby doubling components used for receiving power.

The power circuit and the charging circuit are separately formed in the electronic device, and thus, a pin (e.g., a V_BUS pin) for the power circuit and a pin (e.g., a V_BATT pin) for the charging circuit are separately formed in a connecting unit used to connect to an external power supply device.

Therefore, an external power supply device for the production test must be separately connected to the pin for the power circuit, and an external power supply device for charging must be separately connected to the pin for the charging circuit.

SUMMARY

An aspect of the present disclosure is to address at least the above-mentioned problems and/or disadvantages and to provide at least the advantages described below.

According to an aspect of the present disclosure an electronic device and a method thereof are provided, which connect a common wiring connected to a power pin of a connecting unit, to one of a first power managing unit and a second power managing unit, based on a connected external power supply device.

According to an aspect of the present disclosure, an electronic device is provided. The electronic device includes a connecting unit configured to connect to an external power supply device that provides power to the electronic device; a first power managing unit configured to drive the electronic device using power provided from a first external power supply device connected to the connecting unit; a second power managing unit configured to charge a battery contained in the electronic device using power provided from a second external power supply device connected to the connecting unit; and a switching module configured to connect the connecting unit to one of the first power managing unit and the second power managing unit.

According to another aspect of the present disclosure, method of operating an electronic device is provided. The method includes connecting, to a connecting unit of the electronic device, an external power supply device that provides power to the electronic device; and connecting the connecting unit to one of a first power managing unit and a second power managing unit, wherein the first power managing unit is configured to drive the electronic device using power provided from a first external power supply device connected to the connecting unit and the second power managing unit is configured to charge a battery contained in the electronic device using power provided from a second external power supply device.

According to another aspect of the present disclosure, a non-transitory computer readable recording medium that stores a program to be executed on a computer, wherein the program includes an executable instruction that enables the processor to execute a method when the program is executed by the processor is provided. The method includes connecting, to a connecting unit, an external power supply device that provides power to the electronic device; and connecting the connecting unit to one of a first power managing unit and a second power managing unit, wherein the first power managing unit is configured to drive the electronic device using power provided from the first external power supply device connected to the connecting unit and the second power managing unit is configured to charge a battery contained in the electronic device using power provided from the second external power supply device connected to the connecting unit.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
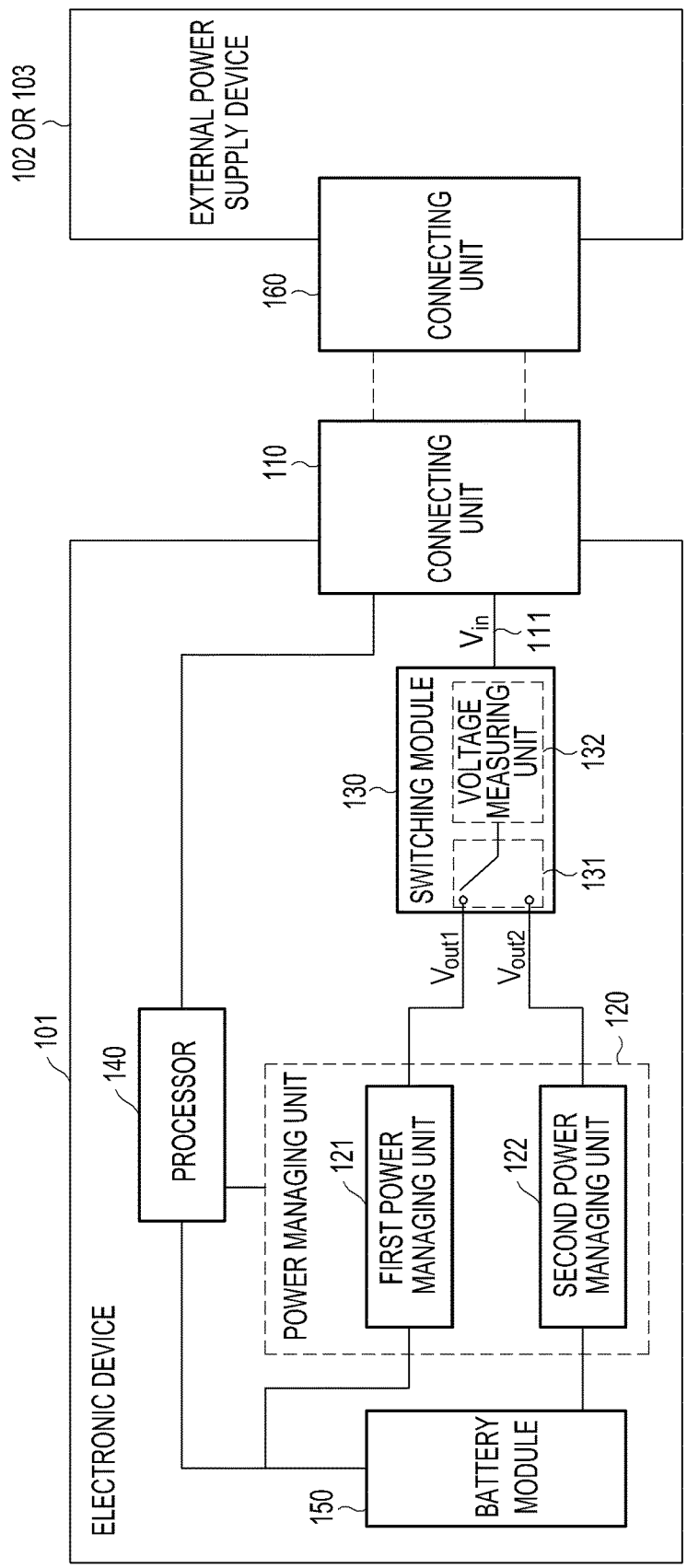
FIG. 1 is a block diagram illustrating an example of a configuration of an electronic device according to an embodiment of the present disclosure.

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

Terms as used herein are merely used for the purpose of explaining some embodiments of the present disclosure and are not intended to limit the present disclosure to the embodiments.

Herein, terms such as "include" and "may include" refer to the existence of a corresponding function, operation, or element, and do not limit one or more additional functions, operations, or elements. Herein, terms such as "include" and/or "have" may denote a certain characteristic, number, step, operation, constituent element, element or a combination thereof, but do exclude the existence of or a possibility of an addition of one or more other characteristics, numbers, steps, operations, constituent elements, elements or combinations thereof.

Herein, the terms "A or B", "at least one of A or/and B", and "one or more of A or/and B" include all possible combinations of the items listed. For example, "A or B", "at least one of A and B", and "at least one of A or B" may each include (1) at least one A, (2) at least one B, or (3) both at least one A and at least one B.

Herein, terms such as "a first", "a second", "the first", and "the second" may modify various components regardless of the order and/or the importance, but does not limit the corresponding components. These terms may be used to distinguish a component element from another component element. For example, a first user device and a second user device indicate different user devices although they are both user devices. For example, a first element may be referred to as a second element, and similarly, a second element may be referred to as a first element without departing from the scope of the present disclosure.

When an element (e.g., a first element) is described as being "(operatively or communicatively) coupled with/to or connected to" another element (e.g., a second element), the first element is directly connected to the second element or the first element is indirectly connected to the another element via yet another element (e.g., a third element). Conversely, when one component element is described as being "directly coupled" or "directly connected" to another component element, a third component element does not exist between the first component element and the second component element.

Herein, the term "configured to" may be interchangeably used with "suitable for", "having the capability to", "designed to", "adapted to", "made to", and "capable of". The term "configured to" does not necessarily imply "specifically designed to" with respect to hardware. Alternatively, in some situations, when a device is described as being "configured to" perform a particular operation, this may indicate that the device, together with other devices or components, "is able to" perform the operation. For example, the phrase "processor adapted (or configured) to perform A, B, and C" may refer to a dedicated processor (e.g. an embedded processor) only for performing the corresponding operations or a generic-purpose processor (e.g., a central processing unit (CPU) or an application processor (AP)) that can perform the corresponding operations by executing one or more software programs stored in a memory device.

Unless defined otherwise, all terms used herein, including technical and scientific terms, have the same meaning as those commonly understood by a person skilled in the art to which the present disclosure pertains. Terms such as those defined in a generally used dictionary may be interpreted to have the same definitions as contextual definitions in the relevant field of art, and are not to be interpreted to have ideal or excessively formal meanings unless clearly defined in the present disclosure. Herein, the terms defined are not to be interpreted to exclude embodiments of the present disclosure.

An electronic device according to an embodiment of the present disclosure may include at least one processor, and may include a camera, a portable device, a mobile terminal, a communication terminal, a portable communication terminal, a portable mobile terminal, etc. For example, the electronic device may include at least one of a smartphone, a tablet personal computer (PC), a mobile phone, a video phone, an electronic book (e-book) reader, a desktop PC, a laptop PC, a netbook computer, a personal digital assistant (PDA), a portable multimedia player (PMP), an MP3 player, a mobile medical appliance, a camera, and a wearable device (e.g., a head-mounted-device (HMD) such as electronic glasses, electronic clothes, an electronic bracelet, an electronic necklace, an electronic appcessory, electronic tattoos, or a smart watch).

An electronic device according to an embodiment of the present disclosure may be a smart home appliance. A home appliance may include, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a television (TV) box (e.g., Samsung HomeSync™, Apple TV™, or Google TV™), a game console (e.g., Xbox™ or PlayStation™), an electronic dictionary, an electronic key, a camcorder, or an electronic photo frame.

An electronic device according to an embodiment of the present disclosure may include a medical device (e.g., various portable medical measuring devices (a blood glucose monitoring device, a heart rate monitoring device, a blood pressure measuring device, a body temperature measuring device, etc.), a magnetic resonance angiography (MRA) device, a magnetic resonance imaging (MRI) device, a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device or a gyrocompass), avionics, security devices, an automotive head unit, a home robot, an industrial robot, an automatic teller machine (ATM) in a bank, a point of sales (POS) machine in a shop, or an Internet device of Things device (e.g., a light bulb, various sensors, electric or gas meter, a sprinkler device, a fire alarm, a thermostat, a streetlamp, a toaster, a sporting goods, a hot water tank, a heater, a boiler, etc.).

An electronic device according to an embodiment of the present disclosure may include at least one a part of furniture or a building/structure, an electronic board, an electronic signature receiving device, a projector, and various kinds of measuring instruments (e.g., a water meter, an electric meter, a gas meter, and a radio wave meter). An electronic device according to an embodiment of the present disclosure may be a combination of one or more of the aforementioned various devices. An electronic device according to an embodiment of the present disclosure may be a flexible device. Further, electronic devices according to an embodiment of the present disclosure are not limited to the aforementioned devices, and may include a new electronic device according to technological developments.

Figure 2:
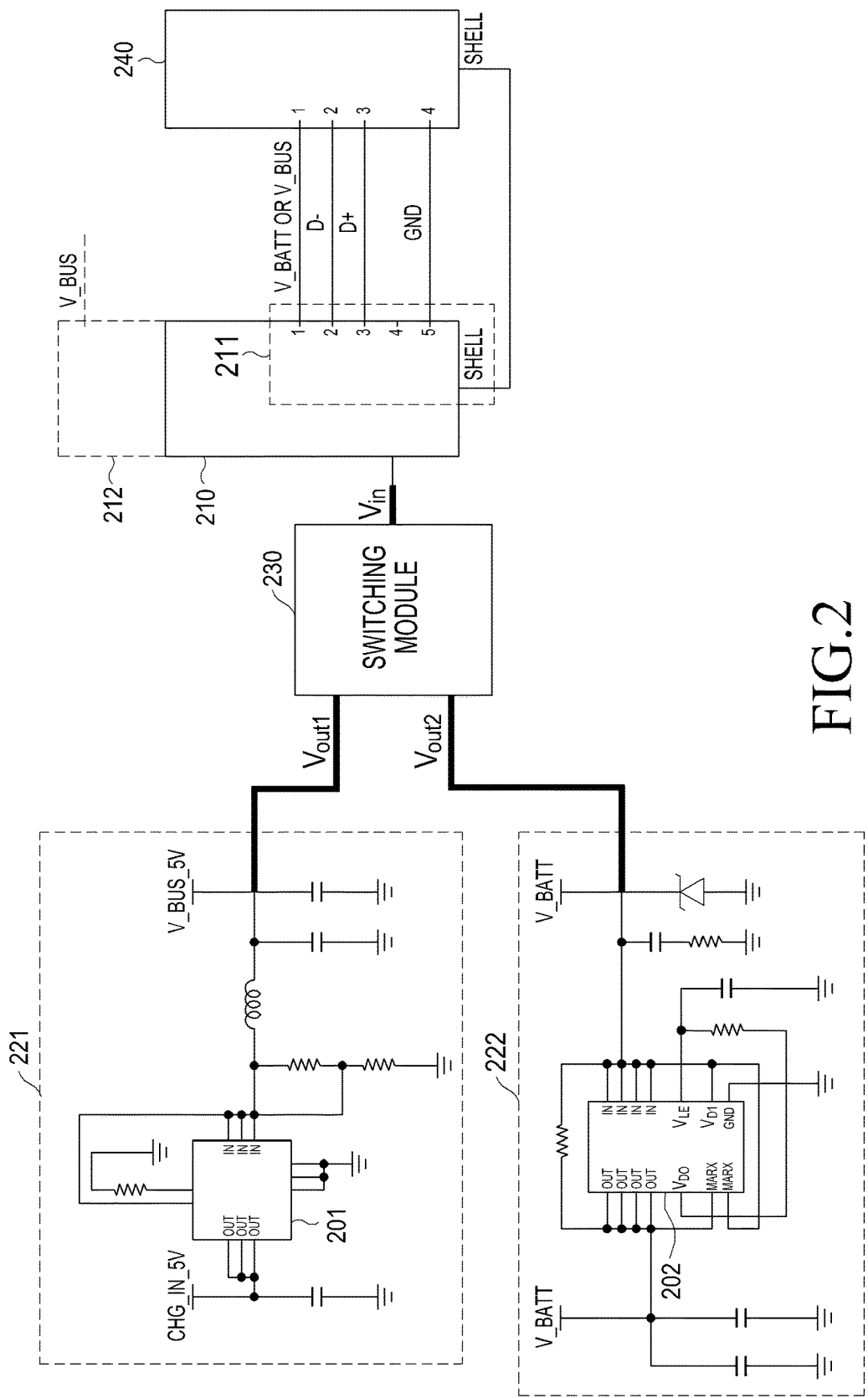
FIG. 2 is a diagram illustrating an example of a configuration of a circuit of an electronic device according to an embodiment of the present disclosure.

FIG. 1 is a diagram illustrating an example of a configuration of an electronic device according to an embodiment of the present disclosure. FIG. 2 is a diagram illustrating an example of a configuration of a circuit of an electronic device according to an embodiment of the present disclosure.

Referring to FIG. 1, an electronic device 101, according to an embodiment of the present disclosure, includes at least one of a connecting unit 110, a power managing unit 120, a switching module 130, a processor 140, and a battery module 150. Through the connecting unit 110, the electronic device 101 connects to a first external power supply device 102 or a second external power supply device 103 that provides power to the electronic device 101. At least one of the components of the electronic device 101 may be omitted, or other components may be additionally included in the electronic device 101 in accordance with embodiments of the present disclosure.

According to an embodiment of the present disclosure, the connecting unit 110 may electrically connect to a connecting unit 160 of the first external power supply device 102 or the second external power supply device 103, and may include at least one connection pin. When a contact point that is included in the connecting unit 160 of the external power supply device 102 or 103 is in contact with each pin of the connecting unit 110, the electronic device 101 and the first external power supply device 102 or the second external power supply device 103 are electrically connected. When the connecting unit 110 electrically connects to the first external power supply device 102 or the second external power supply device 103, the connecting unit 110 may transmit or receive power or data to/from the connected external power supply device 102 or 103. At least a part of the connecting unit 110 may function as an input/output interface that may transfer instructions or data input from a user or another external device to the other component(s) of the electronic device 101. The input/output interface may output the instructions or data received from other component(s) of the electronic device 101 to a user or another external device.

The connecting unit 110 may include at least one connection pin based on various supportable communication regulations (e.g., Universal Serial Bus (USB), micro USB (μUSB), etc.), and a power pin (Vpower pin) (V_BUS or V_BATT) out of the at least one connection pin may be a pin that may receive power from the first external power supply device 102 or the second external power supply device 103, which is connected through the connecting unit 110. The connecting unit 110 may be configured in various forms, such as a Mobile High-Definition (MHL) link a USB (e.g., micro 5pin, 11pin, 21pin, or c-type)) link based on a shape and a connection method, etc. When the connecting unit 110 includes at least one power pin, the connecting unit 110 may be configured in various different corresponding forms.

Referring to FIG. 2, a connecting unit 210 of the electronic device 101 of FIG. 1 includes a connector 211 that includes at least one connection pin for a connection to a connecting unit 240 of an external power supply device. The connector 211 may include, for example, at least one of a power (e.g., V_BUS or V_BATT) pin, a signal (D−(data−), D+(data+)) pin, an IDentifier (ID) pin, a ground (GND) pin, and a SHELL (shielded wiring) pin. The connecting unit 210 may include, for example, a general-purpose input/output (GPIO) pin, a configuration channel pin, a communication channel pin, and/or various other connection pins.

The electronic device 101 may be provided with both power (first power (V_BUS)) for a test in a production process and power (second (V_BATT)) for charging a battery, through the connector 211 of the connecting unit 210 as illustrated in FIG. 2. Therefore, according to an embodiment of the present disclosure, as illustrated in FIG. 2, a connector 212 to which power for the process is provided, may not be separately configured, and may be omitted or removed. The connector 212 is expressed by a broken line to indicate omission or removal of the connector 212 in FIG. 2. At least one of the pins included in the connecting unit 210 may be omitted, and at least one other pin may be added.

For example, an electronic device may be provided with power from an external power supply device that is connected through the V_BUS pin. The electronic device may transmit and/or receive data to/from an external power supply device or another external electronic device, through the data− (D−) or data+ (D+) pin. The electronic device may also determine, through the ID pin, whether an external power supply device or another external electronic device is connected, a type of a connected device, etc.

The connecting unit 110, according to an embodiment of the present disclosure, may be configured to be commonly used by a different type of external device (e.g., the first external power supply device 102 or the second external power supply device 103), by unifying the wiring into a common wiring 111. The first external power supply device 102 and the second external power supply device 103 do not need to be connected separately through connecting units (e.g., the connector 211 and the connector 212 of FIG. 2) which include connection pins and wiring, respectively, but may be connected through the connecting unit 110 that is configured with the common wiring 111 of FIG. 1.

The connecting unit 110 of FIG. 1, for example, may be configured such that the connector 212, which includes separate connection pins for a test in a production process, is omitted or removed, as shown in the connecting unit 210 of FIG. 2. In other words, a separate connection pin (e.g., V_BUS) for the test in the production process is a pin that has almost the same function as at least some (e.g., V_BATT) of the connection pins for charging a battery, and thus, in various embodiments of the present disclosure, one of the overlapping power pins (V_BATT and V-BUS) may be omitted or removed. The connecting unit 210 of FIG. 2 is not required to separately configure a power pin or a connector that includes a power pin (V_BUS) for each purpose, and the connecting unit 210 may be configured to include a connector 211 that includes a power pin that may be commonly used. The power pin (V_BUS or V_BATT) included in the connector 211 may be a common power pin that may be applied to both the production process test and/or battery charging.

According to an embodiment of the present disclosure, the power managing unit 120 of FIG. 1 may be configured to include a first power managing unit 121 or a second power managing unit 122, and may include other components for managing power.

According to an embodiment of the present disclosure, the first power managing unit 121 of FIG. 1 may be configured to drive the electronic device 101 using power provided from the first external power supply device 102 while it is connected to the connecting unit 110. For example, the first power managing unit 121 may provide, to internal components, power for a test performed during a production process of the electronic device 101. More specifically, in a state in which a battery is not installed in the electronic device 101, the first power managing unit 121 may provide power to internal components, thereby driving the electronic device 101.

According to an embodiment of the present disclosure, the second power managing unit 121 of FIG. 1 may be configured to charge a battery that is installed in the electronic device 101, using power provided from the second external power supply device 103 that connects to the connecting unit 110.

According to an embodiment of the present disclosure, the first power managing unit 121 and the second power managing unit 122 of FIG. 1 may be configured with a circuit of a first power managing unit 221 and a circuit of a second power managing unit, respectively, as illustrated in FIG. 2. The circuit of the first power managing unit 221 of FIG. 2 includes a first power managing integrated circuit (IC) 201 for managing power (V_BUS) for a test in a production process, at least one coil, a resistance, and a capacitor. The first power managing IC 201 may be provided with a first power (e.g., V_BUS_5V) from a first output end (Vout1) of a switching module 230, through at least one input pin (IN), and may provide, through at least one output pin (OUT), power (CHG_IN_5V) to components that are formed inside. The circuit of the second power managing unit 222 includes a second power managing IC 202 for managing power (V_BATT) to charge a battery, at least one resistance, a capacitor, and a diode. The second power managing IC 202 may be provided with a second power (e.g., V_BATT) from a second output end (Vout2) of the switching module 230, through at least one input pin (IN), and may provide, through at least one output pin (OUT), power (V_BATT) to a battery module that is formed inside (e.g., the battery module 150 of FIG. 1). The first power managing unit 221 and the second power managing unit 222 of FIG. 2 are not limited to the components that are illustrated in FIG. 2, and at least a few components may be omitted or other components may be added based on a feature of an electronic device including these elements, in accordance with embodiments of the present disclosure.

According to an embodiment of the present disclosure, the switching module 130 of FIG. 1 may be configured to connect the connecting unit 110 to one of the first power managing unit 121 and the second power managing unit 122. The switching module 130 may be connected with a power pin of the connecting unit 110 through the common wiring 111 of an input end (Vin), and may execute an operation of connecting the common wiring 111 to one of the first power managing unit 121 and the second power managing unit 122, which is connected based on a switching condition. Also, the switching module 130 may execute a control to provide voltage (V_BUS or V_BATT) that is input to the input end (Vin) through the common wiring 111, to one of the first power managing unit 121 and the second power managing unit 122, which is connected based on a switching operation.

Although the switching module 130 is illustrated as a separate module in FIG. 1, at least a part of the switching module 130 may be included in the power managing unit 120, the processor 140, or at least one other module, and all of the functions of the switching module 130 may be implemented by being included in the processor 140 or another processor, in accordance with embodiments of the present disclosure.

According to an embodiment of the present disclosure, the switching module 130 includes a switch 131 for performing a switching operation and a power measuring unit 132 for measuring a voltage.

According to an embodiment of the present disclosure, the switch 131 for performing the switching operation may execute a switching operation, i.e., establishing a connection to one of the first power managing unit 121 and the second power managing unit 122, based on a control signal received from the processor 140. Also, the switch 131 may include, for example, a switch for executing a switching function or a switching circuit having a switching function. The switching function may switch between a state in which a pulse is extinct (state of 0) and a state in which a pulse flows (state of 1). Also, the switching circuit may be configured to include, for example, at least one of a transistor, a diode, and an integrated circuit, and at least some of the configuration may be omitted or other components may be added based on a feature of the circuit, in accordance with embodiments of the present disclosure.

Also, according to van embodiment of the present disclosure, the voltage measuring unit 132 may be configured to include at least a part of the processor 140. When power (Vin) is provided through an output end of the connecting unit 110, the voltage measuring unit 132 may measure a voltage provided to the input end (Vin). The voltage measuring unit 132 may compare a measured input voltage and a set voltage (hereinafter, a "set voltage value"), and may execute a control to provide power to one of the first power managing unit 121 and the second power managing unit 122, based on a result of the comparison. The switching module 130 may use a semiconductor device, for example, a logic+ metal oxide silicon field effect transistor (MOSFET) or an insulated gate bipolar mode transistor (IGBT).

According to an embodiment of the present disclosure, the processor 140 of FIG. 1 may determine whether an external power supply device 102 or 103 is connected. The processor 140 may be driven by receiving power from a battery that is charged by the first power managing unit 121 or the second power managing unit 122.

The processor 140 may execute a control operation with respect to supplying power, and may control the electronic device 101 to communicate with another electronic device through the first external power supply device 102 or the second external power supply 103, and may process data received from another electronic device.

According to an embodiment of the present disclosure, the processor 140 may be connected with at least one of a plurality of pins included in the connecting unit 110. Also, the processor 140 may be connected with a pin (e.g., at least one of an enable pin, a configuration channel pin, and a communication channel pin) from among the plurality of pins for detecting whether the first external power supply device 102 or the second external power supply device 103 is connected or detecting a type of external power supply device 102 or 103.

According to an embodiment of the present disclosure, the processor 140 may control the switching module 130 to establish a connection to one of the first power managing unit 121 and the second power managing unit 122, based on a signal received from at least one pin (e.g., at least one of a power pin, an enable pin, a configuration channel pin, and a communication channel pin) of the connecting unit 110.

Also, according to an embodiment of the present disclosure, the processor 140 may include at least one of hardware, software, and firmware. The processor 140 may include at least one of a central processing unit (CPU), a micro processing unit (MPU), an application processor (AP), and a communication processor (CP). Also, at least some of the configuration of the processor 140 may include a memory (e.g., a register and/or random access memory (RAM)) to which at least one memory loading data is loaded, and a part of a bus that inputs/outputs at least one data to the processor and the memory. The processor 140 may be further configured to include a predetermined program routine or program data, which is processed after being loaded from a predetermined recording medium to a memory, so as to execute a function defined in a manner of software in an electronic device.

The processor 140 may carry out operations or data processing related to control and/or communication of at least one other component of the electronic device 101.

According to an embodiment of the present disclosure, the battery module 150 of FIG. 1 may be configured to include components for providing power that drives the electronic device 101, and a battery that is charged with power. The battery module 150 may be provided with power connecting to the second power managing unit 122, and a wiring that provides power to the components formed inside the electronic device 101 may be connected with the first power managing unit 121. The battery module 150 may charge the battery when power is provided through the second power managing unit 122, and may provide power to components of the electronic device 101 using power of the charged battery.

A condition (e.g., a switching condition) for controlling the establishment of a connection to one of the first power managing unit 121 and the second power managing unit 122, may be set using, for example, at least one of a voltage value input from a power pin, an enable signal received from an enable pin, a resistance value received through a configuration channel pin, and identification information received through a communication channel pin. Detailed control operations executed based on switching conditions are described later herein including the description of FIG. 3.

Communication, according to an embodiment of the present disclosure, may be a behavior, a situation, or an action in which devices exchange information. The communication may include transmitting/receiving a signal through a communication channel pin or at least one other pin of the connecting unit 110.

The locations of the main components in the electronic device 101 illustrated in FIGS. 1 and 2 may be changed in accordance with embodiments of the present disclosure.

Although components of an electronic device 101 have been described with reference to FIG. 1 and FIG. 2, an electronic device may include fewer or more components, in accordance with embodiments of the present disclosure According to an embodiment of the present disclosure, an electronic device may include a connecting unit configured to connect to an external power supply device that provides power to the electronic device; a first power managing unit configured to drive the electronic device using power provided from a first external power supply device connected to the connecting unit; a second power managing unit configured to charge a battery contained in the electronic device using power provided from a second external power supply device connected to the connecting unit; and a switching module configured to connect the connecting unit to one of the first power managing unit and the second power managing unit.

According to an embodiment of the present, disclosure, the electronic device may further include a processor configured to transmit, to the switching module, a control signal to control a connection to one of the first power managing unit and the second power managing unit, based on a signal of at least one connection pin of the connecting unit.

According to an embodiment of the present disclosure, the switching module is electrically connected to the connecting unit through a power pin and a common wiring of the connecting unit.

According to an embodiment of the present disclosure, when the connecting unit is connected to the first power managing unit, the switching module provides power provided from the first external power supply device to the first power managing unit through the common wiring.

According to an embodiment of the present disclosure, when the connecting unit is connected to the second power managing unit, the switching module provides power provided from the second external power supply device to the second power managing unit through the common wiring.

According to an embodiment of the present disclosure, the first external power supply device is a power supply device configured to supply power for a production process test of the electronic device, and the second external power supply device is a power supply device configured to supply power for charging the battery.

According to an embodiment of the present disclosure, the switching module is further configured to measure an input voltage of a power pin of the connecting unit, and connects the connecting unit to one of the first power managing unit and the second power managing unit based on the measured input voltage.

According to an embodiment of the present disclosure, when the measured voltage value is at least equal to a set voltage value, the switching module connects the connecting unit to the first power managing unit and provides power to the first power managing unit.

According to an embodiment of the present disclosure, when the measured voltage value is less than a set voltage value, the switching module connects the connecting unit to the second power managing unit and provides power to the second power managing unit.

According to an embodiment of the present disclosure, the processor is further configured to determine whether an external device that is connected to the connecting unit is the first external power supply device or the second external power supply device, based on at least one of a signal of an enable pin, a signal of a configuration channel pin, and a signal of a communication channel pin, which is received from the connecting unit.

According to an embodiment of the present disclosure, the processor is further configured to transmit, to the switching module, a control signal for connecting a power pin of the connecting unit to one of the first power managing unit and the second power managing unit, based on a signal of an enable pin of the connecting unit.

According to an embodiment of the present disclosure, the processor is further configured to measure a terminating resistance of the first external power supply device or the second external power supply device that is connected to the connecting unit, through a configuration channel pin of the connecting unit, and transmits a control signal for a connection to one of the first power managing unit and the second power managing unit based on the measured terminating resistance.

According to an embodiment of the present disclosure, the processor is further configured to determine the identification information of the first external power supply device or the second external power supply device that is connected to the connecting unit, through a communication channel pin of the connecting unit, and transmits, to the switching module, a control signal for a connection to one of the first power managing unit and the second power managing unit based on the determined identification information.

Figure 3:
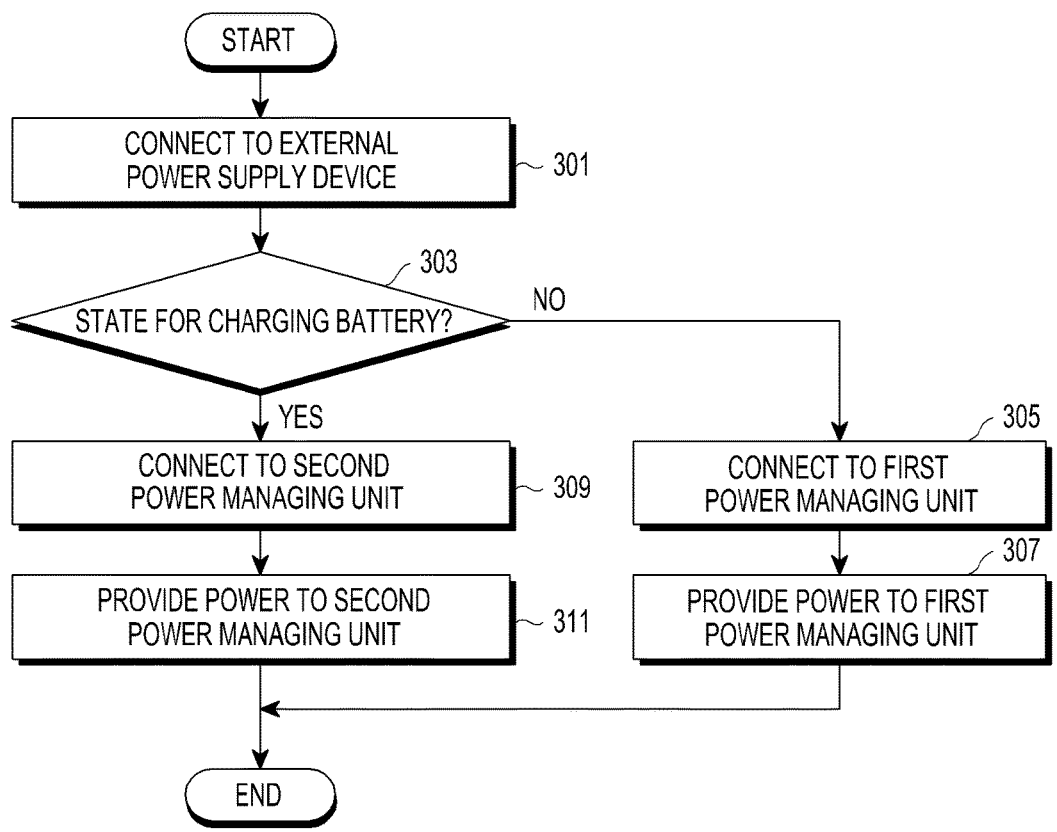
FIG. 3 is a diagram illustrating an operation procedure of an electronic device according to an embodiment of the present disclosure.

FIG. 3 is a diagram illustrating a method of operating an electronic device according to an embodiment of the present disclosure. The electronic device 101 of FIG. 1 or an electronic device 501 of FIG. 5, for example, may perform the method of FIG. 3.

Referring to FIG. 3, according to an embodiment of the present disclosure, an electronic device connects to an external power supply device, in step 301.

In step 303, the electronic device determines whether a current state is a state for charging a battery, based on a signal received from at least one connection pin. More specifically, the electronic device may determine which of a first power managing unit and a second power managing unit, one of which corresponds to a state for charging a battery, is to be connected to a common wiring that is connected with a power pin. The electronic device may determine a power managing unit to which a common wiring is to be connected, based on at least one of an input voltage of a power pin, an enable signal, a resistance value of a configuration channel pin, and an ID received through a communication channel pin.

When a result of the determination shows that the current state is different from the state for charging a battery, the electronic device connects the common wiring to the first power managing unit, in step 305. More specifically, when a currently connected external power supply device is different from the second external power supply device for charging a battery, but is, for example, the first external power supply device for a production process test, the electronic device connects the common wiring to the first power managing unit, which directly provides power to internal components.

In step 307, the electronic device provides power to the connected first power managing unit.

Conversely, when the current state is the state for charging a battery, the electronic device connects the common wiring to the second power managing unit, in step 309. In other words, when the currently connected external power supply device is the second external power supply device for charging a battery, the electronic device connects the common wiring to the second power managing unit for charging a battery.

In step 311, the electronic device provides power to the connected second power managing unit.

According to an embodiment of the present disclosure, a method for operating an electronic device may include connecting, to a connecting unit of the electronic device, an external power supply device that provides power to the electronic device; and connecting the connecting unit to one of a first power managing unit and a second power managing unit, wherein the first power managing unit is configured to drive the electronic device using power provided from a first external power supply device connected to the connecting unit and the second power managing unit is configured to charge a battery contained in the electronic device using power provided from a second external power supply device.

According to an embodiment of the present disclosure, the first external power supply device is a power supply device for a production process test of the electronic device, and the second external power supply device is a power supply device for charging the battery.

According to an embodiment of the present disclosure, connecting the connecting unit may include measuring an input voltage of a power pin of the connecting unit; connecting the power pin of the connecting unit to the first power managing unit through a common wiring when the measured voltage value is at least equal to a set voltage value; and providing power provided from the first external power supply device to the first power managing unit.

According to an embodiment of the present disclosure, connecting the connecting unit may further include connecting the power pin of the connecting unit to the second power managing unit through the common wiring when the measured voltage value is less than the set voltage value; and providing power provided from the second external power supply device to the battery through the second power managing unit.

According to an embodiment of the present disclosure, connecting the connecting unit may include determining a signal of an enable pin of the connecting unit; connecting a power pin of the connecting unit to the first power managing unit through a common wiring when a signal of the enable pin includes a set enable value; and providing power provided from the first external power supply device to the first power managing unit.

According to an embodiment of the present disclosure, connecting the connecting unit may further include connecting the power pin of the connecting unit to the second power managing unit through the common wiring when the signal of the enable pin does not include a set enable value; and providing power provided from the second external power supply device to the battery through the second power managing unit.

According to an embodiment of the present disclosure, connecting the connecting unit may include measuring a terminating resistance of the first external power supply device or the second external power supply device that is connected to the connecting unit, through a configuration channel pin of the connecting unit; determining, based on the measured terminating resistance, whether an external power supply device, which is connected to the connecting unit, is the first external power supply device or the second external power supply device; connecting the power pin of the connecting unit to the first power managing unit through a common wiring when the determined external power supply device is the first external power supply device; and providing power provided from the first external power supply device to the battery through the first power managing unit.

According to an embodiment of the present disclosure, connecting the connecting unit may further include connecting the power pin of the connecting unit to the first power managing unit through a common wiring when the determined external power supply device is the first external power supply device; and providing power provided from the first external power supply device to the battery through the first power managing unit.

According to an embodiment of the present disclosure, connecting the connecting unit may include determining identification information of the first external power supply device or the second external power supply device that is connected to the connecting unit, through a communication channel pin of the connecting unit; determining, based on the determined identification information, whether an external power supply device that is connected to the connecting unit, is the first external power supply device or the second external power supply device; connecting a power pin of the connecting unit to the first power managing unit through a common wiring when the determined external power supply device is the first external power supply device; and providing power provided from the first external power supply device to the first power managing unit.

According to an embodiment of the present disclosure, connecting the connecting unit may further include: connecting the power pin of the connecting unit to the second power managing unit through a common wiring when the determined external power supply device is the second external power supply device; and providing power provided from the first external power supply device to the battery through the second power managing unit.

A configuration and method of operating an electronic device for connecting a common wiring to one of a first power managing unit and a second power managing unit according to an embodiment of the present disclosure are described as follows.

Figure 4:
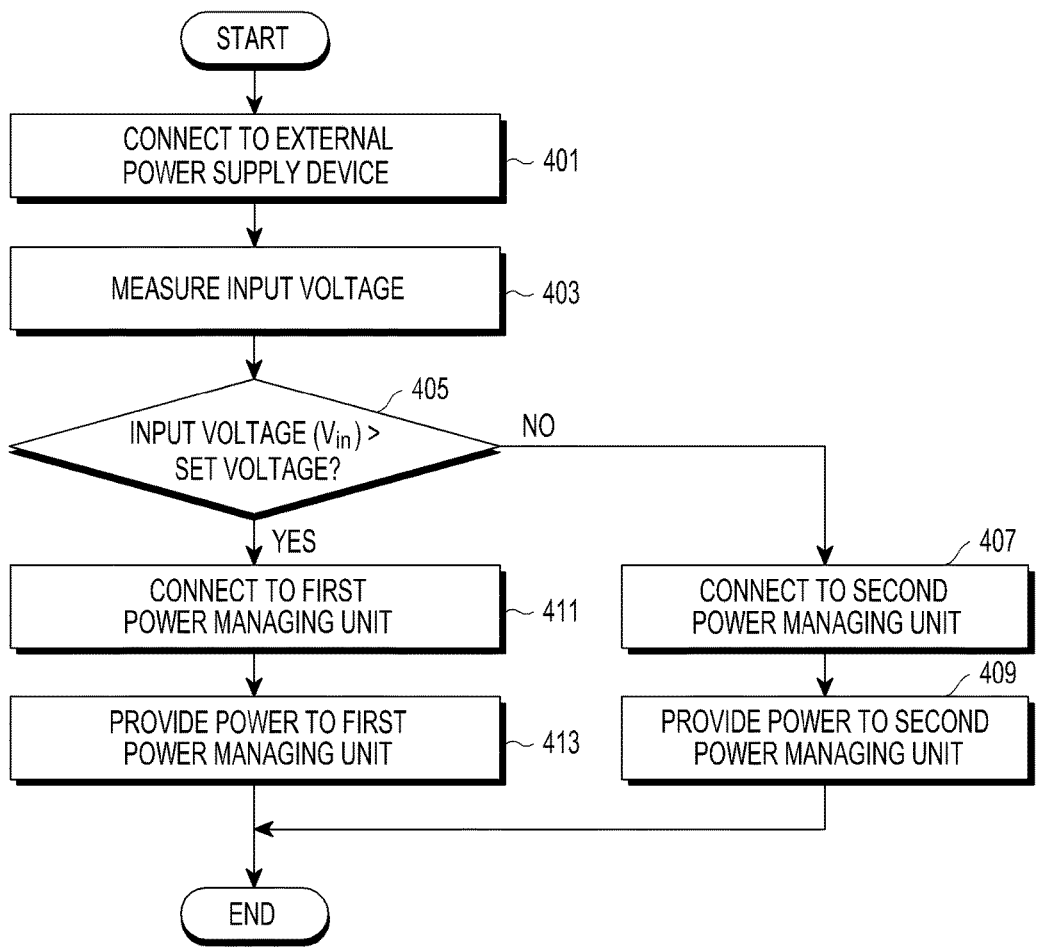
FIG. 4 is a diagram illustrating an operation procedure of an electronic device according to an embodiment of the present disclosure.

FIG. 4 is a diagram illustrating a method of an electronic device according to an embodiment of the present disclosure. An electronic device described in the operation procedure described below may be the electronic device 101 of FIG. 1 or an electronic device 501 of FIG. 5.

Referring to FIG. 4, according to an embodiment of the present disclosure, an electronic device connects to an external power supply device, in step 401.

In step 403, the electronic device measures an input voltage (Vin) of a power pin of a connecting unit. The measurement of the input voltage may be executed in the switching module 130 of the electronic device 101 of FIG. 1, or may be executed by the processor 110 of FIG. 1 or a processor of FIG. 5.

In step 405, the electronic device compares the measured input voltage with a predetermined set value (e.g., a set voltage value).

When a result of the comparison shows that the measured input voltage is at least equal to a set value, the electronic device connects a common wiring to a first power managing unit, in step 407. When a measured input voltage value (e.g., 4.5V to 6V) is at least equal to a set value (e.g., 4.6V), the current state is a state for performing a production process test, and thus, the electronic device connects the common wiring to the first power managing unit. According to an embodiment of the present disclosure, the electronic device is connected with the first power managing unit, and the electronic device may not change its connection state, and therefore maintain its current state. More specifically, when an input voltage (Vin) is at least equal to 4.6V, the electronic device may bypass an output voltage (Vout 2) of a second power managing unit.

In step 409, the electronic device provides power to the connected first power managing unit.

However, when the measured input voltage is less than the set value, the electronic device connects the common wiring to the second power managing unit, in step 411. When a measured input voltage value (e.g., 3.6V to 4.5V) is less than a set value (e.g., 4.6V), the current state is a state for charging a battery, and therefore, the electronic device connects the common wiring to the second power managing unit. When a switch is connected to the first power managing unit, the switch is switched to the second power managing unit, and bypasses an output voltage (Vout 1) provided to the first power managing unit.

In step 413, the electronic device provides power to the connected second power managing unit.

Figure 5:
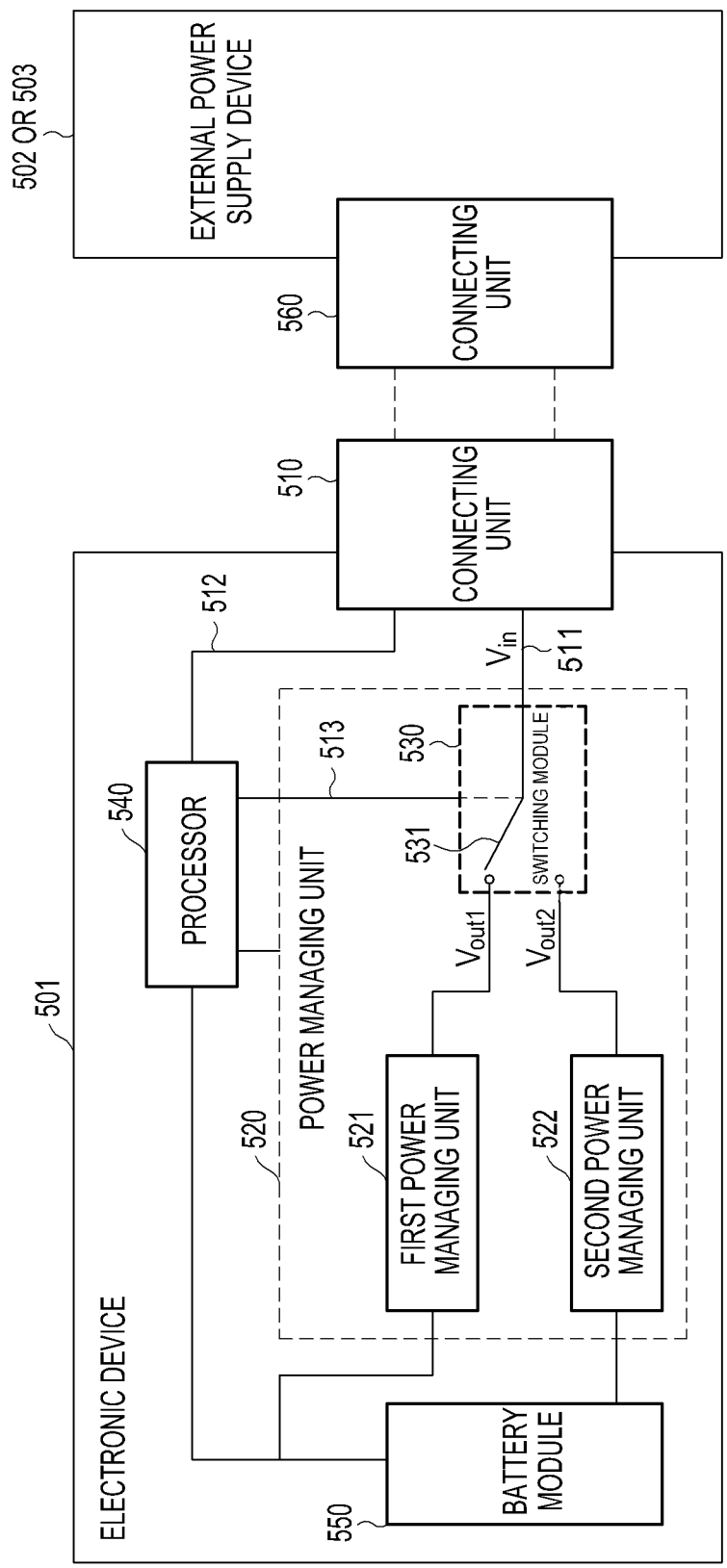
FIG. 5 is a block diagram illustrating an example of a configuration of an electronic device according to an embodiment of the present disclosure.

FIG. 5 is a block diagram illustrating a configuration of an electronic device according to an embodiment of the present disclosure.

Referring to FIG. 5, the electronic device 501, according to an embodiment of the present disclosure, includes a connecting unit 510, a power managing unit 520 including a switching module 530, a processor 540, and a battery 550. The electronic device 501 may connect to first external power supply device 502 or a second external power supply device 503 through the connecting unit 510. At least one of the components of the electronic device 501 may be omitted, or other components may be additionally included in the electronic device 501 in accordance with embodiments of the present disclosure.

According to an embodiment of the present disclosure, the connecting unit 510 may electrically connect to a connecting unit 560 of the external power supply device 502 or 503, and may include at least one connection pin. When a contact point, which is included in the connecting unit 560 of the first external power supply device 502 or the second external power supply device 503, is in contact with each pin of the connecting unit 510, the electronic device 501 and the first external power supply device 502 or the second external power supply device 503 are electrically connected. When the connecting unit 510 electrically connects to the first external power supply device 502 or the second external power supply device 503, the connecting unit 510 may transmit or receive power or data to/from the connected one of the external power supply device 502 and the second external power supply device 503. At least a part of the connecting unit 510, for example, may function as an input/output interface that may transfer instructions or data input from a user or another external device to the other component(s) of the electronic device 501. The input/output interface may output the instructions or data received from the other component(s) of the electronic device 501 to a user or another external device.

The connecting unit 510 may include at least one connection pin based on various supportable communication regulations (e.g., USB, μUSB, etc.), and a power pin (Vpower (e.g., a V_BUS or V_BATT) pin), out of at least one connection pin, may receive power from the connected one of the first external power supply device 501 or the second external power supply device 503, which is connected through the connecting unit 510. According to an embodiment of the present disclosure, the connecting unit 510 may be configured in various forms (e.g., an MHL link, a USB link (e.g., micro 5pin, 11pin, 21pin, or c-type)), etc. based on a shape and a connection method, but the form of the connecting unit 510 is limited thereto. When the connecting unit 510 includes at least one power pin, the connecting unit 510 may be configured in various different corresponding forms. The connecting unit 510 may include at least one of a power (e.g., V_BUS or V_BATT) pin, a signal (data- or data+) pin, an ID pin, a GND pin, and a SHELL (shielded wiring) pin, as illustrated in FIG. 2. The connecting unit 510 may include, for example, a general-purpose input/output (GPIO) pin, a configuration channel pin, and a communication channel pin, and may include various other connection pins.

The connecting unit 510 may be configured to enable a power pin to be connected with the switch 531 of the switching module 530 included in the power managing unit 520, through the common wiring 511, and may be configured to enable at least one of a general-purpose input/output pin of the connecting unit 510, a configuration channel pin, a communication channel pin, and another pin to establish a connection 512 with the processor 540.

The connecting unit 510 of FIG. 5 may be configured, for example, in the same manner as the connecting unit 210 of FIG. 2. Referring to FIG. 2, the connecting unit 210 may be configured in a form in which a connector that includes separate connection pins for a test in a production process, is omitted or removed. In other words, a separate connection pin (e.g., V_BUS) for the test of the production process is a pin has almost the same function as at least some (e.g., V_BATT) of the connection pins for charging a battery, and thus, one of the overlapping power pins (V_BATT and V-BUS) may be omitted or removed. The connecting unit 510 may configure a power pin 511 for common use, like the connecting unit 210 of FIG. 2, instead of configuring a separate power pin for each purpose. The power pin 511 may be a common power pin that may be applied to both a production process test and battery charging.

According to an embodiment of the present disclosure, the power managing unit 520 is configured to include a first power managing unit 521, a second power managing unit 522, and the switching module 530 including the switch 531, and may further include other components for managing power. The first power managing unit 521 and the second power managing unit 522 of FIG. 5 may be configured with the circuit of the first power managing unit 221 of FIG. 2 and the circuit of the second power managing unit 222, respectively. The circuit of the first power managing unit 221 and the circuit of the second power managing unit 222 are not limited to the components that are illustrated in FIG. 2, and at least some of the configuration may be omitted or other components may be added based on a feature of the electronic device 501.

According to an embodiment of the present disclosure, the first power managing unit 521 may be configured to drive the electronic device 501 using power provided from the first external power supply device 502 that connects to the connecting unit 510. For example, the first power managing unit 521 may provide, to internal components, power for a test in a production process of the electronic device 501. When a battery is not installed in the electronic device 501, the first power managing unit 521 may provide power to the internal components.

According to an embodiment of the present disclosure, the second power managing unit 521 may be configured to charge a battery that is contained in the electronic device 501 using power provided from the second external power supply device 503 that connects to the connecting unit 510.

The switching module 530 is included in the power managing unit 520, and is configured to include the switch 531, which executes a switching operation. The switch 531 may be connected with the processor 540, so that the switch may connect the common wiring 511, which is connected with a power pin of the connecting unit 510, to one of the first power managing unit 521 and the second power managing unit 522, based on a control signal transferred from the processor 540.

Although a configuration of switching the common wiring 511 through the switch 531 is illustrated in FIG. 5, the switching module 530 may include a component(s) for a different type of switching according to an embodiment of the present disclosure. The switching module 530 may be configured in various forms, and may include, for example, the switch 531 for executing a switching function or a switching circuit having a switching function. The switching function may indicate switching a state in which an electrical pulse is extinct (i.e., does not flow) (state of 0) and a state in which a pulse flows (state of 1). Also, the switching circuit may be configured to include, for example, at least one of a transistor, a diode, and an integrated circuit, and at least some of the configuration of the switching circuit may be omitted or other components may be added based on a feature of the circuit.

Also, the switching module 530 may provide power supplied through a power pin, to a connected power managing unit out of the first power managing unit 521 and second power managing unit 522.

According to an embodiment of the present disclosure, at least a part of the switching module 530 may be included in the power managing unit 520, the processor 540, or at least one other module, or all of the functions of the switching module 530 may be included in the processor 540 or another processor.

According to an embodiment of the present disclosure, the processor 540 may determine whether the first external power supply device 502 or the second external power supply device 503 is connected to the electronic device 501. The processor 540 may be driven by receiving power from a battery that is charged by the first power managing unit 521 or the second power managing unit 522. The processor 540 may receive a signal through a wiring 512 that is connected with at least one pin (at least one of an enable pin, a configuration channel pin, and a communication channel pin), and may determine a resistance of a configuration channel pin of the connected external power supply device 502 or 503 or ID information of the connected external power supply device 502 or 503, based on the received signal.

The processor 540 may execute a control operation with respect to supplying power, and may control the electronic device 501 to communicate with another electronic device through the first external power supply device 502 or the second external power supply device 503, and may process data received from the other electronic device.

According to an embodiment of the present disclosure, the processor 540 may be connected with at least one of a plurality of pins included in the connecting unit 510. Also, the processor 540 may be connected with a pin (e.g., at least one of an enable pin, a configuration channel pin, and a communication channel pin) for detecting whether the first external power supply device 502 or the second external power supply device 503 is connected or a type of external power supply device, out of the plurality of pins.

According to an embodiment of the present disclosure, the processor 540 may control the switch 531 of the switching module 530 to establish a connection to one of the first power managing unit 521 and the second power managing unit 522, based on a signal received from at least one pin (e.g., at least one of a power pin, an enable pin, a configuration channel pin, and a communication channel pin) of the connecting unit 510.

Also, according to an embodiment of the present disclosure, the processor 540 may generate a control signal for controlling the switch 531, based on information (e.g., a resistance value or ID information) that is received through the wiring 512 that is connected with at least one of a power pin, an enable pin, a configuration channel pin and a communication channel pin, and may transfer the generated control signal to the switching module 530.

Also, according to an embodiment of the present disclosure, the processor 540 may include, for example, at least one of hardware, software, and firmware. The processor 140 may include one or more of a CPU, an MPU, an AP, and a CP. Also, at least some of the configuration of the processor 540 may include a memory (e.g., a register and/or RAM) to which at least one memory loading data is loaded, and a part of a bus that inputs/outputs at least one data to the processor and the memory. Also, the processor 540 may include a predetermined program routine or program data, which is processed after being loaded from a predetermined recording medium to a memory, so as to execute a function defined in a software manner in an electronic device.

For example, the processor 540 may carry out operations or data processing related to the control and/or communication of at least one other components of the electronic device 501.

According to an embodiment of the present disclosure, the battery module 550 may include components for providing power that drives the electronic device 501, and a battery that is charged with power. The battery module 550 may be provided with power via a connection with the second power managing unit 522, and wiring that provides power to the components formed inside the electronic device 501 may be connected with the first power managing unit 521. The battery module 550 may charge the battery when power is provided through the first power managing unit 521, and may provide power to components of the electronic device 501 using power of the charged battery.

The external power supply devices (e.g., the first external power supply device 502 or the second external power supply device 503) may establish a connection through the single connecting unit 510 of FIG. 5 (e.g., the connector 211 of FIG. 2), as opposed to separately establishing a connection through a corresponding connecting unit.

A condition (e.g., a switching condition) for controlling whether to establish a connection with one of the first power managing unit 521 and the second power managing unit 522, may be set using, for example, at least one of an input voltage value of a power pin, an enable signal received from an enable pin, a resistance value received through a configuration channel pin, and ID information received through a communication channel pin. The detailed control operations executed based on the switching condition are described later herein.

Communication, according to an embodiment of the present disclosure, may refer to a behavior, situation, or action in which devices exchange information. According to an embodiment of the present disclosure, the communication may include transmitting/receiving a signal through a communication channel pin or at least one other pin of the connecting unit 510.

The locations of the components in the electronic device 501 illustrated in FIG. 5 may be changed in accordance with embodiments of the present disclosure.

Although components of an electronic device 501 have been described with reference to FIG. 5, an electronic device may include fewer or more components in accordance with embodiments of the present disclosure.

Figure 6:
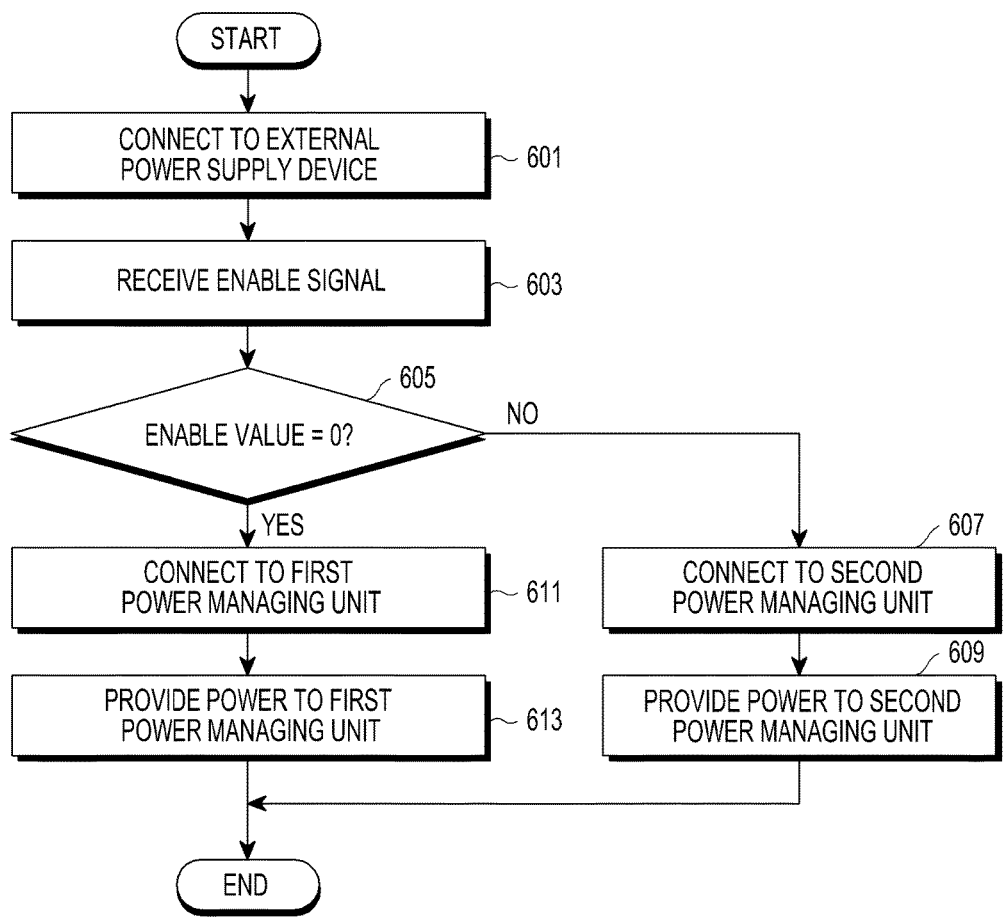
FIG. 6 is a diagram illustrating an operation procedure of an electronic device according to an embodiment of the present disclosure.

FIG. 6 is a diagram of a method of operating an electronic device according to an embodiment of the present disclosure. An electronic device in the method of FIG. 6 may be the electronic device 501 of FIG. 5.

Referring to FIG. 6, according to an embodiment of the present disclosure, an electronic device connects to an external power supply device, in step 601. According to an embodiment of the present disclosure, when the current state is a state in which the electronic device does not operate (i.e., driving power is currently not available to the electronic device), or when the electronic device is an initial production process, a switch is connected to a first power managing unit, and thus, a processor of the electronic device may be provided with power through the first power managing unit.

In step 603, the processor is driven through power provided through the first power managing unit, and the electronic device receives an enable signal from an enable pin of a connecting unit that is connected with the driven processor.

In step 605, the electronic device determines an enable value included in the received enable signal. For example, when the enable value is a predetermined enable value (e.g., 1), the electronic device proceeds with step 611, and when the enable value is a different predetermined value (e.g., when the enable value is 0 instead of 1), the electronic device proceeds with step 607.

When the enable value is 0, the electronic device determines that a second external power supply device for charging is connected, and connects a common wiring to a second power managing unit, in operation 607. According to an embodiment of the present disclosure, when the switch of the electronic device is connected to the first power managing unit, a connection state of the switch may be changed to a connection to the second power managing unit.

In step 609, the electronic device charges a battery by providing power to a battery module through the connected second power managing unit.

Conversely, when the enable value is 1, the electronic device determines that a first external power supply device for a production process test is connected, and connects the common wiring to the first power managing unit, in step 611. According to an embodiment of the present disclosure, when the switch of the electronic device is connected to the first power managing unit, the electronic device maintains the connection state of the switch.

In step 613, the electronic device continuously provides power to the processor or internal components through the connected first power managing unit.

Figure 7:
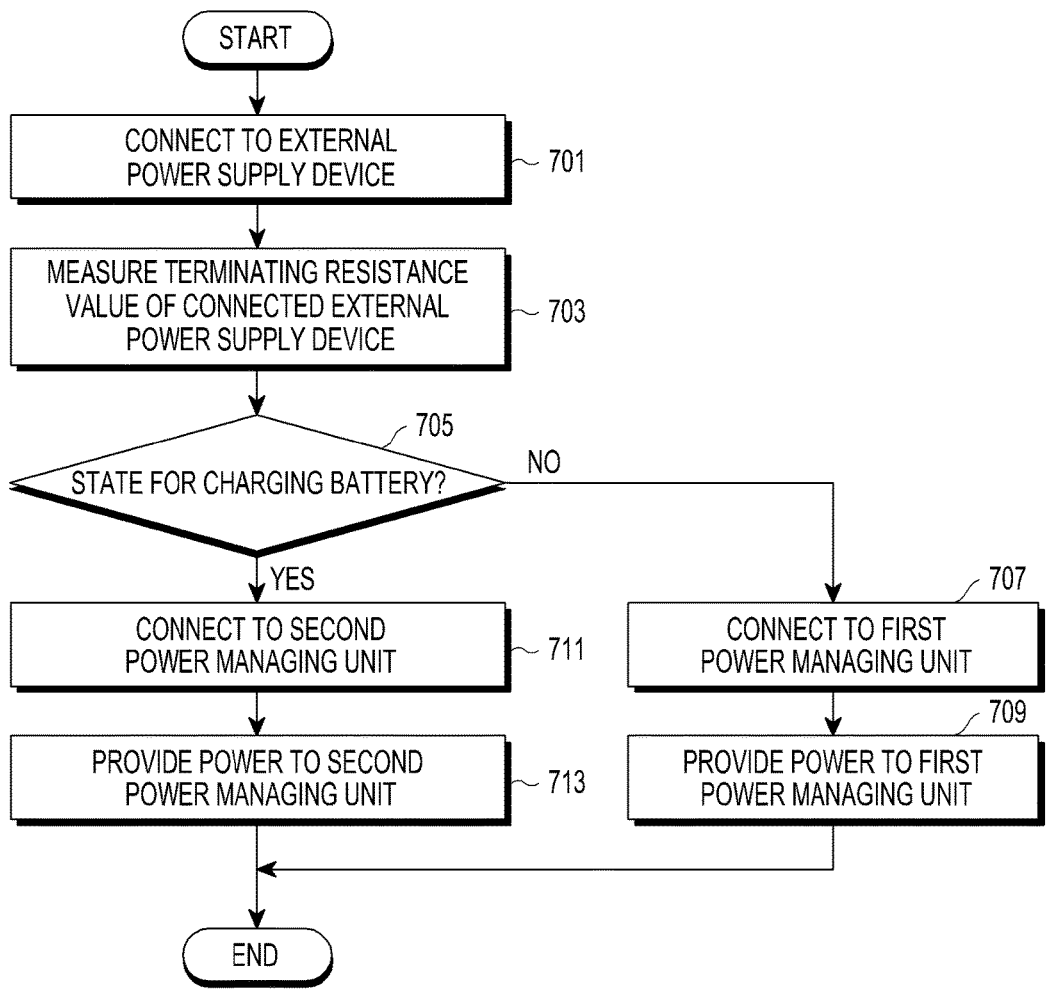
FIG. 7 is a diagram illustrating an operation procedure of an electronic device according to an embodiment of the present disclosure.

FIG. 7 is a diagram illustrating a method of operating an electronic device according to various embodiments of the present disclosure. The electronic device 501 of FIG. 5, for example, may perform the method of FIG. 7.

Referring to FIG. 7, according to an embodiment of the present disclosure, an electronic device connects to an external power supply device in operation 701. When the current state of the electronic device is a state in which the electronic device does not operate (i.e., there is no driving power available to the electronic device), or when the electronic device is undergoing an initial production process, a switch is connected to a first power managing unit, and thus, a processor of the electronic device may be provided with power through the first power managing unit.

In step 703, the processor is driven through the power provided through the first power managing unit, and the electronic device measures a terminating resistance value of a configuration channel pin included in a connecting unit of an external power supply device, so as to determine a feature or type of a connected external power supply device. According to an embodiment of the present disclosure, the processor of the electronic device receives a configuration channel signal from a configuration channel pin of a connecting unit that is connected with a configuration channel pin of a connected external power supply device, may convert the received configuration channel signal into a digital value, and may measure a terminating resistance value based on the converted digital value. The configuration channel signal may be reflected after being transmitted, through the configuration channel pin, to the configuration channel pin of the connecting unit of the external power supply device.

In step 705, the electronic device compares the measured terminating resistance value with a predetermined value (e.g., a predetermined resistance value), and determines a connected external power supply device. According to an embodiment of the present disclosure, the electronic device detects a predetermined resistance value corresponding to the measured terminating resistance value, and determines whether a state corresponding to the detected predetermined resistance value is a state for charging a battery (i.e., determines whether a device corresponding to the predetermined resistance value is a second external power supply device for charging a battery).

When the current state is not a state for charging a battery (i.e., it is determined that the device corresponding to the predetermined resistance value is a first external power supply device for a production process test), the electronic device establishes a connection to the first power managing unit in step 707, so as to provide power to internal components. According to an embodiment of the present disclosure, when the switch of the electronic device is connected to the first power managing unit, the electronic device may maintain the connection state of the switch.

In step 709, the electronic device provides the connected first power managing unit with the power provided from the second external power supply device, so as to continuously provide power to internal components.

However, when the current state is a state for charging a battery (i.e., it is determined that the device corresponding to the set resistance value is the second external power supply device), the electronic device establishes a connection with the second power managing unit that is connected with a battery module and executes charging a battery, in step 711. According to an embodiment of the present disclosure, when the switch of the electronic device is connected to the first power managing unit, a connection state of the switch may be changed to a connection to the second power managing unit.

In step 713, the electronic device provides the second power managing unit with the power provided from the second external power supply device, so as to charge a battery.

Figure 8:
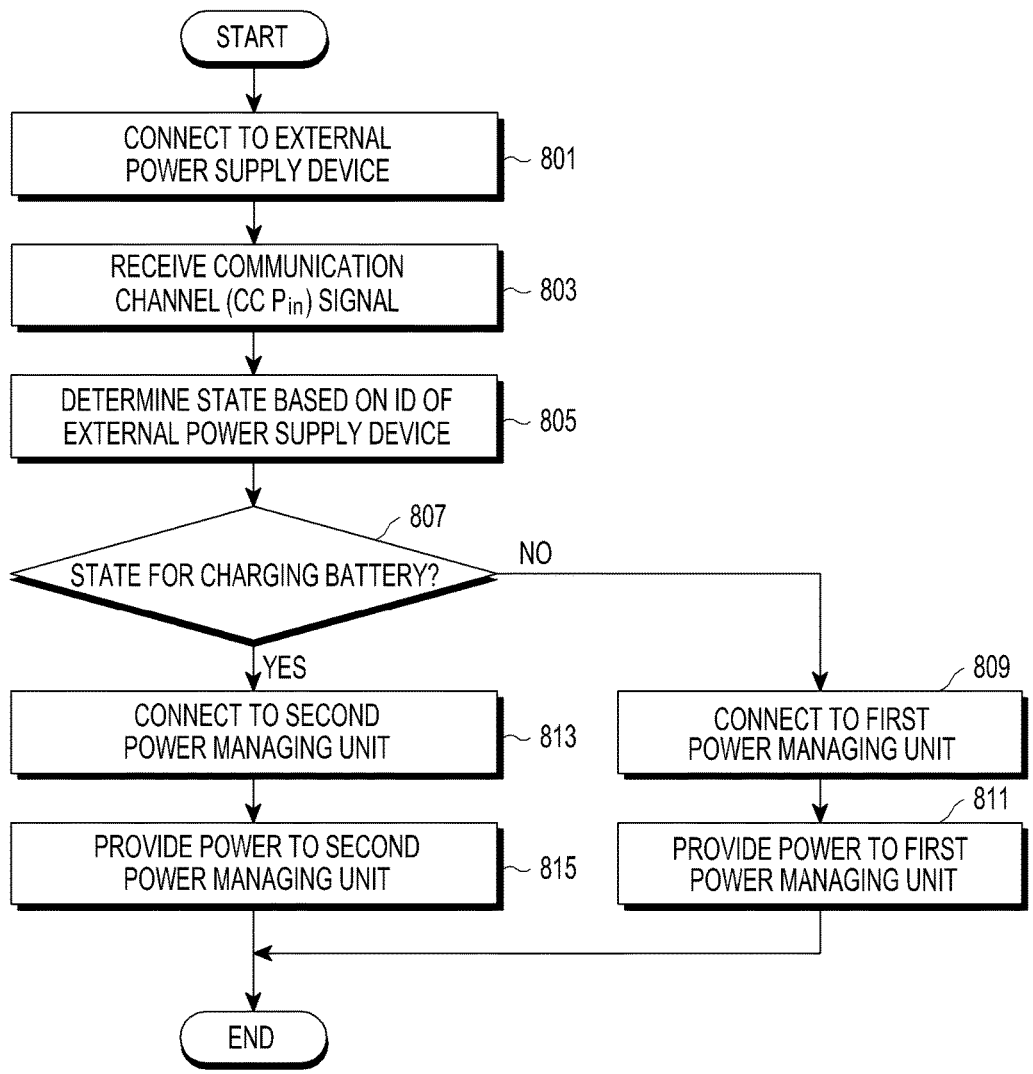
FIG. 8 is a diagram illustrating an operation procedure of an electronic device according to an embodiment of the present disclosure.

FIG. 8 is a diagram illustrating a method of operating an electronic device according to an embodiment of the present disclosure. The electronic device 501 of FIG. 5, for example, may perform the method of FIG. 8.

Referring to FIG. 8, according to an embodiment of the present disclosure, an electronic device connects to an external power supply device, in step 801. When the current state of the electronic device is a state in which the electronic device does not operate (i.e., when driving power is not currently available to the electronic device), or when the electronic device is undergoing an initial production process, a switch is connected to a first power managing unit and thus, a processor of the electronic device may be provided with power through the first power managing unit.

In step 803, a processor is driven using power provided through the first power managing unit, and the electronic device receives a communication channel signal through a communication channel pin so as to determine a feature or a type of a connected external power supply device.

In step 805, the electronic device converts the received communication channel signal into a digital value, determines ID information of the external power supply device based on the digital value, and determines the current state based on the determined ID information.

In step 807, the electronic device determines whether the current state of the electronic device is a state for charging a battery based on the determined ID information (i.e., whether a second external power supply device for charging a battery is connected to the electronic device).

When the current state is not the state for charging a battery (i.e., when a first external power supply device for performing a production process test is connected), the electronic device establishes a connection to the first power managing unit, so as to provide power to internal components, in step 809. According to an embodiment of the present disclosure, when the switch of the electronic device is connected to the first power managing unit, the electronic device may maintain the connection state of the switch.

In step 811, the electronic device provides the connected first power managing unit with the power provided from the first external power supply device, so as to continuously provide power to the internal components.

However, when the current state of the electronic device is the state for charging a battery (i.e., when the second external power supply device is connected to the electronic device), the electronic device establishes a connection to the second power managing unit, which is connected to a battery module, and executes charging a battery, in step 813. According to an embodiment of the present disclosure, when the switch of the electronic device is connected to the first power managing unit, a connection state of the switch may be changed to a connection to the second power managing unit.

In step 815, the electronic device provides the connected second power managing unit with the power provided from the second external power supply device, so as to charge a battery.

Although the methods of FIGS. 6 to 8 have described as being executed under a control of the processor 540 of the electronic device 501 of FIG. 5 above, the switching module 130 of the electronic device 101 FIG. 1 may be configured to execute the functions of the processor 540 of FIG. 5 so as to execute methods of FIGS. 6 to 8, in accordance with embodiments of the present disclosure.

According to various embodiments of the present disclosure, as described above, an electronic device does not require separate connecting units that include connection pins for connection to different external power supply devices (e.g., a first external power supply device for a production process test or a second external power supply device for charging a battery), but may be provided with power through a power pin of a single connecting unit. Also, an electronic device may be connected to a first power managing unit (e.g., a circuit that manages power for a production process test) and a second power managing unit (e.g., a circuit that manages power for charging a battery) through a common wiring that is connected to a power pin included in a single connecting unit, based on a switching condition. Also, an electronic device is not required to configure overlapping connection pins (e.g., V_BUS and V_BATT) and thus, a redundantly configured connection pin may be omitted, removed, or used for a different purpose. In association with a connecting unit of the electronic device, in a case of a 11-pin connecting unit of the electronic device, 2-pin used for V_BATT is redundant and thus, the 2-pin may be used for a high-speed charging pin which is applied to only a 21-pin connecting unit and for an MHL 2.0 line or USB 3.0 that is applied to the 21-pin connecting unit. In association with a connecting unit of the electronic device, in a case of a C-type connecting unit, V_BUS 2 pin and SUB1 1pin, which are separately configured, may be configured as a single V_BUS.

An electronic device that is currently used based on the operations of the switching module of FIGS. 1 to 5 and the processor of FIGS. 1 to 5, may execute the operations according to various embodiments of the present disclosure without changing the configuration of a connecting unit.

According to various embodiments of the present disclosure, when an electronic device is configured such that overlapping pins are unified into a single pin, wiring of main layers of a main PCB and a sub-FPCB may be reduced and a design may be optimized. Also, overlapping components used for configuring a V_BUS circuit and a V_BATT circuit (e.g., ESD-dedicated cap & diode, an over voltage protector (OVP) & load software (SW), an EMI-dedicated bead, or a B to B connector pin for junction of a main PCB or a sub FPCB), may be reduced.

Figure 9:
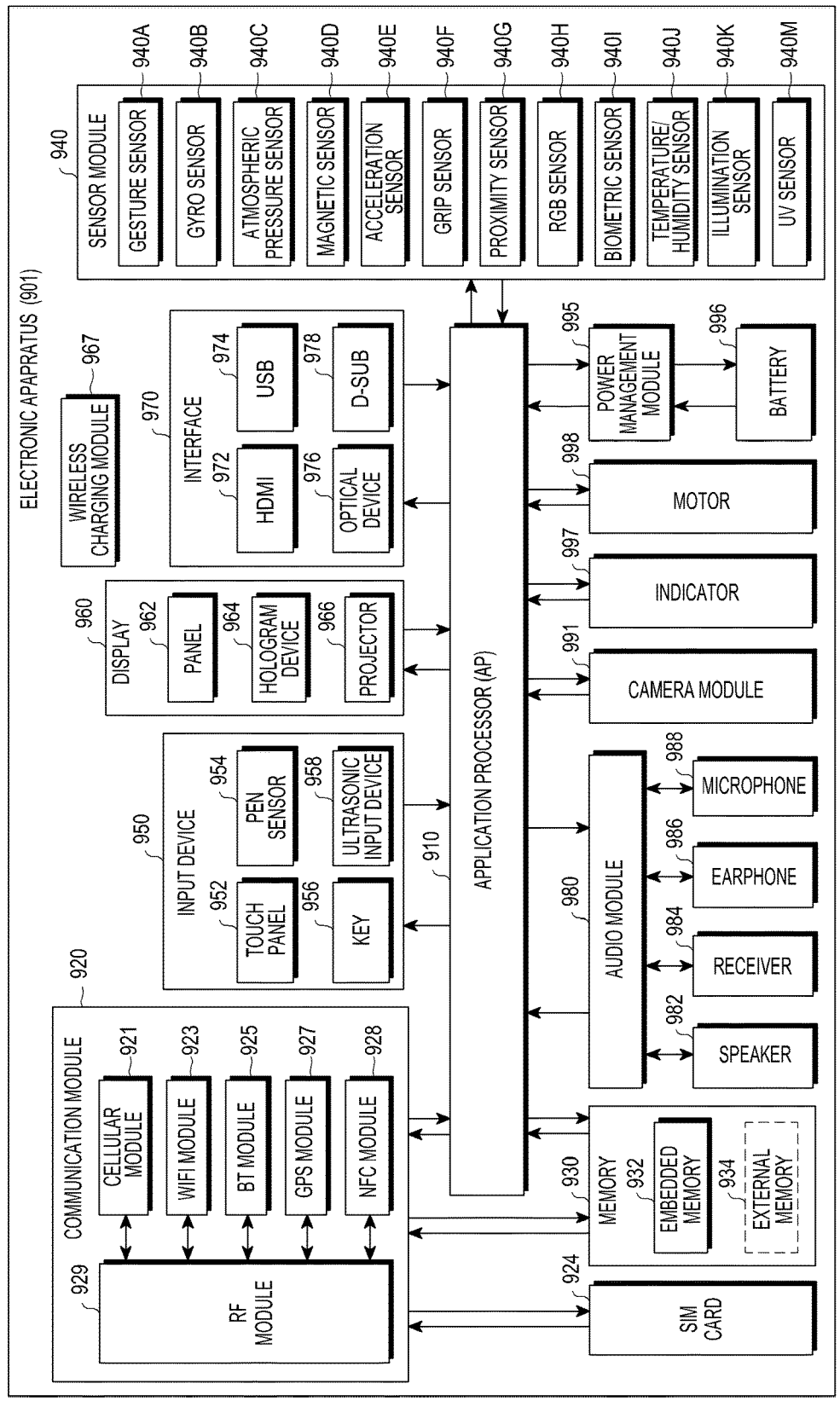
FIG. 9 is a block diagram illustrating a detailed configuration of an electronic device according to an embodiment of the present disclosure.

FIG. 9 is a block diagram illustrating a detailed configuration of an electronic device according to an embodiment of the present disclosure. An electronic device 901 of FIG. 9 may form, for example, a part or the entirety of the electronic device 101 of FIG. 1 or the electronic device 501 of FIG. 5.

Referring to FIG. 9, the electronic device 901 includes at least one AP 910, a communication module 920, a subscriber identifier module (SIM) card 924, a memory 930, a sensor module 940, an input device 950, a display 960, an interface 970, an audio module 980, a camera module 991, a power managing module 995, a battery 996, an indicator 997, and a motor 998.

The at least one AP 910 may include, for example, a configuration that is identical or similar to the processor 140 of FIG. 1 or the processor 540 of FIG. 5. For example, a plurality of hardware or software components connected with the at least one AP 910 may be controlled by driving an operating system or an application program, and processing of various pieces of data and calculations may be executed. The at least one AP 910 may be embodied as, for example, a system on chip (SoC). According to an embodiment of the present disclosure, the at least one AP 910 may further include a graphic processing unit (GPU) and/or an image signal processor. The at least one AP 910 may also include at least some of the other components illustrated in FIG. 9 (e.g. a cellular module 921). The at least one AP 910 may load instructions or data, received from at least one other component (e.g., a non-volatile memory), in a volatile memory to process the loaded instructions or data, and may store various data in a non-volatile memory.

The communication module 920 may have, for example, a configuration identical or similar to the communication function of the connecting unit 110 of FIG. 1 or the connecting unit 510 of FIG. 5. The communication module 920 includes, for example, a cellular module 921, a WiFi module 923, a BT module 925, a GPS module 927, an NFC module 928, and a radio frequency (RF) module 929.

The cellular module 921 may provide voice call, video call, text message services, or Internet services through, for example, a communication network. According to an embodiment of the present disclosure, the cellular module 921 may identify and authenticate the electronic device 901 within a communication network by using the SIM card 924. According to an embodiment of the present disclosure, the cellular module 921 may perform at least some of functions that may be provided by the at least one AP 910, and the cellular module 921 may include a CP.

Each of the Wi-Fi module 923, the BT module 925, the GPS module 927, and the NFC module 928 may include, for example, a processor for processing data transmitted/received through a corresponding module. According to an embodiment of the present disclosure, two or more of the cellular module 921, the WiFi module 923, the BT module 925, the GPS module 927, and the NFC module 928 may be included in one integrated chip (IC) or IC package.

The RF module 929 may transmit/receive, for example, a communication signal (e.g., an RF signal). The RF module 929 may include, for example, a transceiver, a power amp module (PAM), a frequency filter, a low noise amplifier (LNA), or an antenna. According to another embodiment of the present disclosure, at least one of the cellular module 921, the WIFI module 923, the BT module 925, the GPS module 927, and the NFC module 928 may transmit/receive an RF signal through a separate RF module.

The SIM card 924 may contain a subscriber identification module and/or an embedded SIM, and may contain unique identification information (for example, an integrated circuit card identifier (ICCID)) or subscriber information (for example, an international mobile subscriber identity (IMSI)).

The memory 930 may include, for example, an embedded memory 932 or an external memory 934. The embedded memory 932 may include at least one of, for example, a volatile memory (for example, a dynamic random access memory (DRAM), a static RAM (SRAM), a synchronous dynamic RAM (SDRAM), etc.) and a non-volatile memory (e.g., a one time programmable read only memory (OTPROM), a programmable ROM (PROM), an erasable and programmable ROM (EPROM), an electrically erasable and programmable ROM (EEPROM), a mask ROM, a flash ROM, a flash memory (for example, a NAND flash memory or a NOR flash memory), a hard driver, or a solid state drive (SSD)).

The external memory 934 may further include a flash drive, for example, a compact flash (CF), a secure digital (SD), a micro secure digital (Micro-SD), a mini secure digital (Mini-SD), an extreme Digital (xD), a memory stick, or the like. The external memory 934 may be functionally and/or physically connected to the electronic device 901 through various interfaces.

The sensor module 940 may sense input information (e.g., a gesture input) corresponding to an instruction for transmitting information associated with at least one object. The sensor module 940 may measure, for example, a physical quantity or detect an operation state of the electronic device 901, and may convert the measured or detected information to an electrical signal. The sensor module 940 includes, for example, a gesture sensor 940A, a gyro sensor 940B, an atmospheric pressure sensor 940C, a magnetic sensor 940D, an acceleration sensor 940E, a grip sensor 940F, a proximity sensor 940G, a color sensor 940H (e.g., a red, green, and blue (RGB) sensor), a biometric sensor 940I, a temperature/humidity sensor 940J, an illumination sensor 940K, and an Ultra Violet (UV) sensor 940M. Additionally or alternatively, the sensor module 940 may include, for example, an E-nose sensor, an electromyography (EMG) sensor, an electroencephalogram (EEG) sensor, an electrocardiogram (ECG) sensor, an infrared (IR) sensor, an iris scanner, and/or a fingerprint sensor. The sensor module 940 may further include a control circuit for controlling at least one sensor included therein. According to an embodiment of the present disclosure, the electronic device 901 may further include a processor that is configured to control the sensor module 940, as a part of the at least one AP 910 or a separate component, thereby controlling the sensor module 940 while the at least one AP 910 is in a sleep mode.

The input device 950 includes, for example, a touch panel 952, a (digital) pen sensor 954, a key 956, or an ultrasonic input device 958. The touch panel 952 may use at least one of, for example, a capacitive type, a resistive type, an infrared type, and an ultrasonic type touch panel. The touch panel 952 may further include a control circuit. The touch panel 952 may further include a tactile layer, and may provide a tactile reaction to a user.

The (digital) pen sensor 954 may include, for example, a recognition sheet which is a part of the touch panel, or a separate recognition sheet. The key 956 may include, for example, a physical button, an optical key or a keypad. The ultrasonic input unit 958 may input data through an input means that generates an ultrasonic signal, and the electronic device 901 may identify data by detecting the ultrasonic waves with a microphone 988.

The display 960 includes a panel 962, a hologram 964, and a projector 966. The panel 962 may be, for example, a flexible, a transparent, or a wearable panel. The panel 962 may also be integrated with the touch panel 952 as a single module. The hologram device 964 may show a stereoscopic image in the air by using an interference of light. The projector 966 may project light onto a screen to display an image. For example, the screen may be located inside or outside the electronic device 901. According to an embodiment of the present disclosure, the display 960 may further include a control circuit for controlling the panel 962, the hologram device 964, or the projector 966.

The interface 970 includes, for example, a high-definition multimedia interface (HDMI) 972, a USB interface 974, an optical interface 976, or a d-subminiature (D-sub) 978. The interface 970 may have a configuration identical or similar to the connecting unit 110 of FIG. 1 or the connecting unit 510 of FIG. 5. Additionally or alternatively, the interface 970 may include, for example, a USB interface, an MI-IL interface, an SD card/multi-media card (MMC) interface, or an infrared data association (IrDA) standard interface.

The audio module 980 may bilaterally convert, for example, a sound and an electrical signal. The audio module 980 may process sound information input or output through, for example, a speaker 982, a receiver 984, earphones 986, or the microphone 988.

The camera module 991 may photograph, for example, a still image or a video image, and may include one or more image sensors (e.g., a front sensor or a back sensor), a lens, an image signal processor (ISP), or a flash (for example, a light emitting diode (LED) or a xenon lamp) according to an embodiment of the present disclosure.

The power managing module 995 may manage, for example, power of the electronic device 901. At least a part of the power managing module 995 may have a configuration identical or similar to the power managing unit 120 of FIG. 1, the power managing unit 221 and 222 of FIG. 2, or the power managing unit 520 of FIG. 5. According to an embodiment of the present disclosure, the power managing module 995 may include a power management integrated circuit (PMIC), a charger integrated circuit (IC), or a battery gauge. The PMIC may have a wired and/or wireless charging scheme. Examples of the wireless charging method may include, for example, a magnetic resonance method, a magnetic induction method, or an electromagnetic method. Additional circuits for wireless charging, for example, a coil loop, a resonance circuit, a rectifier, may be further included. The battery gauge may measure, for example, the residual quantity of battery 996, or a voltage, a current, or a temperature during charging. The battery 996 may include, for example, a rechargeable battery and/or a solar battery.

The indicator 997 may indicate particular states, for example, a booting state, a message state, or a charging state, of the electronic device 901 or a part (e.g., the AP 910) of the electronic device 901. The motor 998 may convert an electrical signal into mechanical vibrations, and may generate a vibration or haptic effect. The electronic device 901 may include a processing device (e.g., a GPU) for supporting a mobile TV. The processing device for supporting the mobile TV may process media data according to a standard of digital multimedia broadcasting (DMB), digital video broadcasting (DVB), or media flow.

Each of the components of the electronic device according to the present disclosure may be implemented by one or more components, and the name of the corresponding component may vary depending on a type of the electronic device. In various embodiments of the present disclosure, the electronic device 901 of FIG. 9 may include at least one of the above-described elements, and may exclude some of the elements or further include other additional elements. Further, some of the components of the electronic device 901 of FIG. 9 according to the various embodiments of the present disclosure may be combined to form a single entity, and thus, may equivalently execute functions of the corresponding elements prior to the combination. For example, the electronic device of FIG. 1, FIG. 2, or FIG. 5 may include at least one of the above-described elements of the electronic device 901 of FIG. 9.

Figure 10:
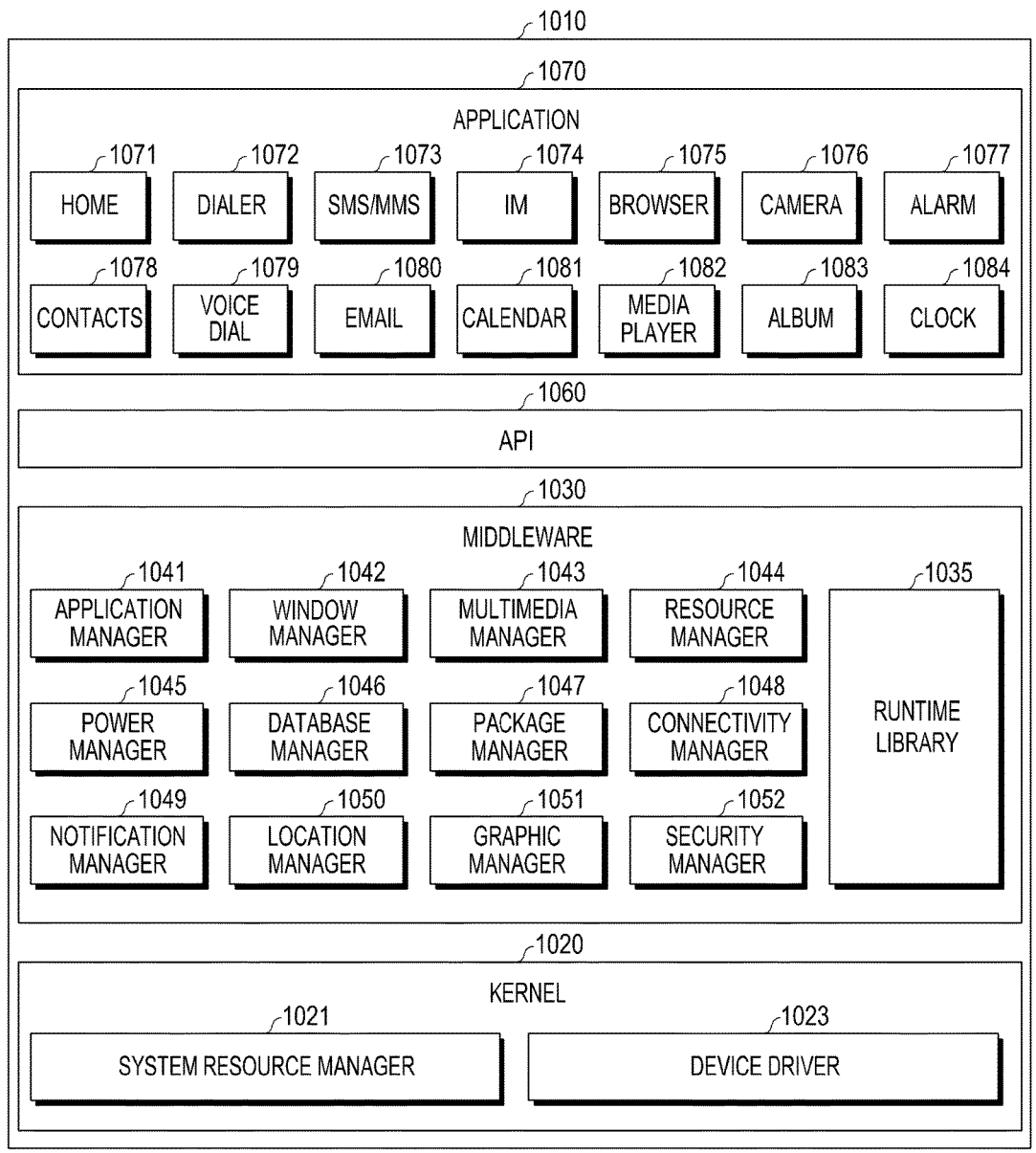
FIG. 10 is a block diagram illustrating a detailed configuration of an electronic device according to an embodiment of the present disclosure.

FIG. 10 is a block diagram illustrating a detailed configuration of an electronic device according to an embodiment of the present disclosure.

According to an embodiment of the present disclosure, a program module 1010 (e.g., a program) of an electronic device of FIG. 10 (e.g., the electronic device 101 of FIG. 1 or the electronic device 501 of FIG. 5) may include an operating system (OS) that controls resources related to the electronic device and/or various applications that are driven in the OS. The operating system may be, for example, Android, iOS, Windows, Symbian, Tizen, Bada, etc.

The program module 1010 includes a kernel 1020, a middleware 1030, an application programming interface (API) 1060, and applications 1070. At least some of the program module 1010 may be preloaded to an electronic device, or may be downloaded from a server.

The kernel 1020 may include, for example, a system resource manager 1021 or a device driver 1010. The system resource manager 1021 may control, allocate, or collect the system resources. According to an embodiment of the present disclosure, the system resource manager 1021 may include a process managing unit, a memory managing unit, or a file system managing unit. The device driver 1023 may include, for example, a display driver, a camera driver, a Bluetooth driver, a shared-memory driver, a USB driver, a keypad driver, a WIFI driver, an audio driver, or an inter-process communication (IPC) driver.

The middleware 1030 may provide a function required by the applications 1070 in common, or may provide various functions to the applications 1070 through the API 1060 so that the applications 1070 may efficiently use limited system resources of an electronic device. According to an embodiment of the present disclosure, the middleware 1030 may include, for example, at least one of a runtime library 1035, an application manager 1041, a window manager 1042, a multimedia manager 1043, a resource manager 1044, a power manager 1045, a database manager 1046, a package manager 1047, a connectivity manager 1048, a notification manager 1049, a location manager 1050, a graphic manager 1051, and a security manager 1052.

The run time library 1035 may include, for example, a library module that a compiler uses to add new functions through a programming language, while the applications 1070 are executed. The run time library 1035 may perform input/output management, memory management, or a function for an arithmetic function.

The application manager 1041, for example, may manage a life cycle of at least one of the applications 1070. The window manager 1042 may manage a graphical user interface (GUI) resource used in a screen. The multimedia manager 1043 may recognize a format required for reproducing various media files, and encode or decode a media file using a codec appropriate for the corresponding format. The resource manager 1044 may manage resources, such as a source code of at least one of the applications 1070, a memory, or a storage space.

The power manager 1045 may operate together with, for example, a basic input/output system (BIOS), so as to manage a battery or power, and may provide power information required for the operation of an electronic device. The database manager 1046 may generate, search for, or change a database to be used by at least one of the applications 1070. The package manager 1047 may manage the installation or updating of applications distributed in a package file form.

The connectivity manager 1048, for example, may manage wireless connections, such as WiFi or Bluetooth. The notification manager 1049 may display or report an event such as a received message, an appointment, a proximity notification, and the like to a user without disturbance. The location manager 1050 may manage location information of an electronic device. The graphic manager 1051 may manage graphic effects to be provided to a user and user interfaces related to the graphic effects. The security manager 1052 may provide various security functions required for system security or user authentication. According to an embodiment of the present disclosure, when the electronic device (e.g., the electronic device 101 of FIG. 1 or the electronic device 501 of FIG. 5) has a telephone call function, the middleware 1030 may further include a telephony manager for managing a voice or video call function of the electronic device.

The middleware 1030 may include a middleware module for forming a combination of various functions of the aforementioned components. The middleware 1030 may provide a module specialized for each type of OS in order to provide a differentiated function. Also, the middleware 1030 may dynamically remove a few existing components, or add new components.

The API 1060 is, for example, a set of API programming functions, and may be provided in a different configuration based on an OS. For example, in a case of Android or iOS, one API set may be provided for each platform, and in a case of Tizen, two or more API sets may be provided for each platform.

The applications 1070 may include, for example, one or more applications that are capable of providing functions such as home 1071, dialer 1072, SMS/MMS 1073, instant message (IM) 1074, browser 1075, camera 1076, alarm 1077, contacts 1078, voice dial 1079, email 1080, calendar 1081, media player 1082, album 1083, clock 1084, health care (for example, measuring exercise quantity or blood sugar), or environment information (e.g., atmospheric pressure, humidity, or temperature information).

According to an embodiment of the present disclosure, the application 1070 may include an application the electronic device (e.g., the electronic device 101 of FIG. 1 or the electronic device 501 of FIG. 5), an external device (e.g., the external power supply device 102 or 103 of FIG. 1, or an external power supply device 502 or 503 of FIG. 5), or an application (hereinafter referred to as "information exchanging application") that supports exchanging information between external electronic devices. The information exchange application may include, for example, a notification relay application for transferring predetermined information to the external electronic device, or a device management application for managing the external electronic device.

For example, the notification relay application may include a function of delivering, to an external electronic device, notification information generated by other applications (e.g., an SMS/MMS application, an email application, a health care application, or an environmental information application) of the electronic device. Further, the notification relay application, for example, may receive notification information from an external electronic device, and may provide the received notification information to a user. The device management application, for example, may manage (e.g, install, delete, or update) at least one function of an external electronic device that communicates with the electronic device (e.g., a function of turning on/off the external electronic device itself (or some components) or a function of adjusting luminance (or a resolution) of the display), applications operating in the external electronic device, or services provided by the external electronic device (e.g., a call service and a message service). According to an embodiment of the present disclosure, the application 1070 includes an application (e.g., health care application) designated based on a property of the external electronic device (e.g., as a property of the electronic device, when a type of electronic device is a mobile medical device). According to an embodiment of the present disclosure, the application 1070 may include an application received from an external electronic device, and the applications 1070 may include a preloaded application or a third party application that may be downloaded from a server. The names of the components of the program module 1010 of the illustrated embodiment of the present disclosure may be changed according to the type of operating system.

According to an embodiment of the present disclosure, at least a part of the programming module 1010 may be implemented in software, firmware, hardware, or a combination thereof. At least some of the programming module 1010 may be implemented (for example, executed) by, for example, the processor (for example, the AP 1010). At least some of the programming module 1010 may include, for example, a module, program, routine, sets of instructions, process, or the like for performing one or more functions.

The terms "module" and "functional unit", as used herein, may refer to a unit including one of hardware, software, and firmware or a combination of two or more of them. The "module" may be interchangeably used with, for example, the terms "unit", "logic", "logical block", "component", or "circuit". The terms "module" and "function unit" may refer to a minimum unit of an integrated component element or a part thereof. The term "module" may refer to a minimum unit for performing one or more functions or a part thereof. A module or a function unit may be mechanically or electronically implemented. For example, a module or function unit according to an embodiment of the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments of the present disclosure, at least some of the devices (e.g., modules or functions thereof) or the method (for example, operations) according to the present disclosure may be implemented by a command stored in a computer-readable storage medium in a programming module form. The command, when executed by one or more processors (e.g., the processor 140 of FIG. 1 or the processor 540 of FIG. 5), may cause the one or more processors to execute a function corresponding to the command. The computer-readable storage medium may be, for example, the memory.

The computer readable recoding medium may include a hard disk, a floppy disk, magnetic media (e.g., a magnetic tape), optical media (e.g., a compact disc read only memory (CD-ROM) and a digital versatile disc (DVD)), magneto-optical media (e.g., a floptical disk), a hardware device (e.g., a read only memory (ROM), a random access memory (RAM), a flash memory), etc. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module 1010, according to an embodiment of the present disclosure, may include one or more of the aforementioned components or may further include other additional components, or some of the aforementioned components may be omitted. The operations performed by the modules, programming module 1010, or other elements according to various embodiments of the present disclosure may be executed in a sequential, parallel, repetitive, or heuristic manner. Further, some operations may be executed according to another order or may be omitted, or other operations may be added. According to an embodiment of the present disclosure, there is provided a non-transitory computer readable recording medium that stores a program to be executed on a computer, wherein the program includes an executable instruction that enables the processor to execute a method when the program is executed by the processor. The method includes connecting, to a connecting unit, an external power supply device that provides power to the electronic device; and connecting the connecting unit to one of a first power managing unit and a second power managing unit, wherein the first power managing unit is configured to drive the electronic device using power provided from a first external power supply device connected to the connecting unit, and the second power managing unit is configured to charge a battery contained in the electronic device using power provided from a second external power supply device connected to the connecting unit.

According to another aspect of the present disclosure an electronic device and a method thereof are provided. In the electronic device and the method thereof, the electronic device connects a connecting unit to one of a first power managing unit and a second power managing unit based on a type or feature of a connected external power supply device, and thus, the electronic device does not include doubled connection pins respectively for external power supply devices, and commonly uses a connecting unit by unifying the connecting unit through the single wiring. Accordingly, wiring and components for power supply may be reduced.

While the disclosure has been shown and described with reference to certain embodiments thereof, it will be understood by those skilled in the art that various changes in form and details may be made therein without departing from the spirit and scope of the disclosure as defined by the appended claims and their equivalents.

What is claimed is:

1. An electronic device, comprising:
   a connector including a plurality of connection pins;
   a first power managing circuit;
   a second power managing circuit; and
   a switching module configured to connect the connector to one of the first power managing circuit and the second power managing circuit,
   wherein the connector is configured to:
      connect a first connector of a first external device supplying a first power for a production process test of the electronic device using a portion of the plurality of connection pins of the connector, and
      connect a second connector of a second external device supplying a second power for charging a battery of the electronic device using the portion of the plurality of connection pins of the connector,
   wherein the switching module is configured to:
      when the connector is connected to the first connector of the first external device, connect the connector to the first connector of the first external device using a first pin of the plurality of connection pins for the first power provided from the first external device to be provided to the first power managing circuit, and
      when the connector is connected to the second connector of the second external device, connect the connector to the second connector of the second external device using the first pin of the plurality of connection pins for the second power provided from the second external device to be provided to the second power managing circuit, and
   wherein the first pin is a power pin configured to connect the connector to the first power managing circuit or the second power managing circuit through a common wiring.

2. The electronic device of claim 1, further comprising:
   a processor configured to transmit, to the switching module, a control signal to control a connection to one of the first power managing circuit and the second power managing circuit based on a signal of at least one connection pin of the plurality of connection pins.

3. The electronic device of claim 2, wherein the processor is further configured to identify whether the connector is connected to the first external device or the second external device, based on a signal received by at least one second pin of the plurality of connection pins, wherein the at least one second pin is an enable pin, a configuration channel pin, or a communication channel pin.

4. The electronic device of claim 2, wherein the processor is further configured to transmit, to the switching module, a control signal for connecting the first pin of the connector to one of the first power managing circuit and the second power managing circuit, based on a signal of an enable pin of the connector.

5. The electronic device of claim 2, wherein the processor is further configured to:
identify, through a configuration channel pin of the connector, a terminating resistance of the first external device or the second external device that is connected to the connector, and
transmit a control signal for a connection to one of the first power managing circuit and the second power managing circuit based on the terminating resistance.

6. The electronic device of claim 2, wherein the processor is further configured to:
obtain, through a communication channel pin of the connector, identification information of the first external device or the second external device that is connected to the connector, and
transmit, to the switching module, a control signal for a connection to one of the first power managing circuit and the second power managing circuit based on the identification information.

7. The electronic device of claim 1, wherein the switching module is further configured to:
identify an input voltage of the first pin,
when the input voltage is at least equal to a set voltage value, connect the first pin to the first power managing circuit, and
when the input voltage is less than a set voltage value, connect the first pin of the connector to the second power managing circuit.

8. A method of operating an electronic device, the method comprising:
connecting, by a connector of the electronic device, a first connector of a first external device supplying a first power for a production process test of the electronic device using a portion of a plurality of connection pins of the connector or a second connector of a second external device supplying a second power for charging a battery of the electronic device using the portion of the plurality of connection pins of the connector;
when the connector is connected to the first connector of the first external device, connecting, by a switching module of the electronic device, the connector to the first connector of the first external device using a first pin of the plurality of connection pins for to the first power provided from the first external device to be provided to the first power managing circuit; and
when the connector is connected to the second connector of the second external device, connecting, by the switching module, the connector to the second connector of the second external device using the first pin of the plurality of connection pins for the second power provided from the first external device to be provided to the second power managing circuit,
wherein the first pin is a power pin configured to connect the connector to the first power managing circuit or the second power managing circuit through a common wiring.

9. The method of claim 8, wherein connecting, by the switching module, the connector using the first pin of the plurality of connection pins to the first power managing circuit comprises:
identifying an input voltage of the first pin of the connector; and
when the input voltage is at least equal to a set voltage value, connecting the first pin of the connector to the first power managing circuit through the common wiring.

10. The method of claim 8, wherein connecting, by the switching module, the connector using the first pin of the plurality of connection pins to the second power managing circuit comprises:
identifying an input voltage of the first pin of the connector; and
when the input voltage is less than a set voltage value, connecting the first pin of the connector to the second power managing circuit through the common wiring.

11. The method of claim 8, wherein connecting, by the switching module, the connector using the first pin of the plurality of connection pins to the first power managing circuit comprises:
obtaining a signal of an enable pin of the connector; and
connecting the first pin of the connector to the first power managing circuit through the common wiring when a signal of the enable pin includes a set enable value.

12. The method of claim 8, wherein connecting, by the switching module, the connector using the first pin of the plurality of connection pins to the second power managing circuit comprises:
obtaining a signal of an enable pin of the connector; and
connecting the first pin of the connector to the second power managing circuit through the common wiring when the signal of the enable pin does not include a set enable value.

13. The method of claim 8, wherein connecting, by the switching module, the connector using the first pin of the plurality of connection pins to the first power managing circuit comprises:
obtaining a terminating resistance of the first external device or the second external device that is connected to the connector through a configuration channel pin of the connector;
identifying whether the connector is connected to the first external device or the second external device based on the terminating resistance; and
when the connector is identified as being connected to the first external device, connecting the first pin of the connector to the first power managing circuit through the common wiring.

14. The method of claim 8, wherein connecting, by the switching module, the connector using the first pin of the plurality of connection pins to the second power managing circuit comprises:
obtaining a terminating resistance of the first external device or the second external device that is connected to the connector through a configuration channel pin of the connector;
identifying whether the connector is connected to the first external device or the second external device based on the terminating resistance; and
when the connector is identified as being connected to the second external device, connecting the first pin of the connector to the second power managing circuit through the common wiring.

15. The method of claim 8, wherein connecting, by the switching module, the connector using the first pin of the plurality of connection pins to the first power managing circuit comprises:
  obtaining, through a communication channel pin of the connector, identification information of the first external device or the second external device that is connected to the connector;
  identifying whether the connector is connected to the first external device or the second external device based on the identification information; and
  when the connector is identified as being connected to the first external device, connecting the first pin of the connector to the first power managing circuit through the common wiring.

16. The method of claim 8, wherein connecting, by the switching module, the connector using the first pin of the plurality of connection pins to the second power managing circuit comprises:
  obtaining, through a communication channel pin of the connector, identification information of the first external device or the second external device that is connected to the connector;
  identifying whether the connector is connected to the first external device or the second external device; and
  when the connector is identified as being connected to the second external device, connecting the power pin of the connector to the second power managing circuit through the common wiring.

17. A non-transitory computer readable recording medium that stores a program to be executed on a computer, wherein the program includes an executable instruction that enables a processor to execute a method when the program is executed by the processor, the method comprising:
  connecting, by a connector of an electronic device, a first connector of a first external device supplying a first power for a production process test of the electronic device using a portion of a plurality of connection pins of the connector or a second connector of a second external device supplying a second power for charging a battery of the electronic device using the portion of the plurality of connection pins of the connector;
  when the connector is connected to the first connector of the first external device, connecting, by a switching module of the electronic device, the connector to the first connector of the first external device using a first pin of the plurality of connection pins for the first power provided from the first external device to be provided to the first power managing circuit; and
  when the connector is connected to the second connector of the second external device, connecting, by the switching module, the connector to the second connector of the second external device using the first pin of the plurality of connection pins for the second power provided from the first external device to be provided to the second power managing circuit,
  wherein the first pin is a power pin configured to connect the connector to the first power managing circuit or the second power managing circuit through a common wiring.

* * * * *